(12) United States Patent
Burk et al.

(10) Patent No.: US 7,126,581 B2
(45) Date of Patent: Oct. 24, 2006

(54) MULTIMODE MULTIZONE INTERFACE

(75) Inventors: Mike T. Burk, Peachtree City, GA (US); Jerry A. Rathje, Peachtree City, GA (US); Daisuke Iino, Peachtree City, GA (US); Larry Craig, Plymouth, MI (US)

(73) Assignee: Panasonic Automotive Systems Company of America, Peachtree City, GA (US)

( * ) Notice: Subject to any disclaimer, the term of this patent is extended or adjusted under 35 U.S.C. 154(b) by 175 days.

(21) Appl. No.: 10/991,786

(22) Filed: Nov. 18, 2004

(65) Prior Publication Data
US 2005/0172230 A1    Aug. 4, 2005

Related U.S. Application Data

(63) Continuation-in-part of application No. 10/461,100, filed on Jun. 13, 2003, and a continuation-in-part of application No. 10/461,836, filed on Jun. 13, 2003.

(60) Provisional application No. 60/523,220, filed on Nov. 18, 2003, provisional application No. 60/388,214, filed on Jun. 13, 2002, provisional application No. 60/388,586, filed on Jun. 13, 2002, provisional application No. 60/388,588, filed on Jun. 13, 2002, provisional application No. 60/388,217, filed on Jun. 13, 2002, provisional application No. 60/388,337, filed on Jun. 13, 2002, provisional application No. 60/388,838, filed on Jun. 14, 2002, provisional application No. 60/389,023, filed on Jun. 14, 2002, provisional application No. 60/388,824, filed on Jun. 14, 2002, provisional application No. 60/388,698, filed on Jun. 14, 2002, provisional application No. 60/389,048, filed on Jun. 14, 2002.

(51) Int. Cl.
*G09G 5/00*    (2006.01)

(52) U.S. Cl. .................. 345/156; 345/173; 715/821
(58) Field of Classification Search ............. 345/156, 345/168, 169, 173; 715/810, 821
See application file for complete search history.

(56) References Cited

U.S. PATENT DOCUMENTS

| | | | |
|---|---|---|---|
| 5,250,935 A * | 10/1993 | Jonker et al. | 345/440.1 |
| 5,463,599 A | 10/1995 | Yifrach et al. | |
| 6,375,630 B1 * | 4/2002 | Cutler et al. | 601/57 |
| 6,460,356 B1 * | 10/2002 | Tao et al. | 62/175 |

FOREIGN PATENT DOCUMENTS

| | | |
|---|---|---|
| DE | 100 50 223 A | 4/2002 |
| EP | 0687081 A1 | 12/1995 |
| EP | 0844778 A2 | 5/1998 |

OTHER PUBLICATIONS

Blaupunkt, "TravelPilot DX-R70", 2001.
Becker, "Operation Guide: Model: Traffic Pro 4720", Jan. 2002.
Wegweisend, Jan. 2002.

* cited by examiner

*Primary Examiner*—Ricardo Osorio
(74) *Attorney, Agent, or Firm*—Laurence S. Roach

(57) ABSTRACT

The interface uses a combination of controls. Mode independent controls retain essentially the same function throughout all modes and features and mode dependent controls vary based on the active mode or feature. The arrangement of the mode controls, the soft controls and the display is designed to facilitate the user's interaction with the system. The system provides some redundant controls so that the user can select the control that is most convenient or intuitive for that user. The interface supports a multizone system having a primary zone and one or more secondary zones. Information for the active mode of the active zone is provided via the display.

16 Claims, 26 Drawing Sheets

MULTIMODE MULTIZONE INTERFACE

RELATED APPLICATIONS

This application claims priority to U.S. Provisional Application No. 60/523,220 entitled "Multi-Media Multi-Mode Interface" filed Nov. 18, 2003, which is incorporated herein by reference. This application is a continuation-in-part of U.S. application Ser. No. 10/461,100 entitled "Interface for a Multifunctional System" and U.S. application Ser. No. 10/461,836 entitled "Multimode Interface" both filed Jun. 13, 2003 and both claiming priority to U.S. Provisional Application No. 60/388,214 entitled "Telematics Display for Efficient User Interaction" filed Jun. 13, 2002; U.S. Provisional Application No. 60/388,586 entitled "Dual Display for Simultaneous Graphics and Textual Display" filed Jun. 13, 2002; U.S. Provisional Application No. 60/388,588 entitled "Direct Access for Vehicle Controlled Information Acquisition" filed Jun. 13, 2002; U.S. Provisional Application No. 60/388,217 entitled "Geographical Fencing for Vehicles" filed Jun. 13, 2002; U.S. Provisional Application No. 60/388,337 entitled "Multimedia Information Provision for Mobile Media Players" filed Jun. 13, 2002; U.S. Provisional Application No. 60/388,838 entitled "Nested Navigational System for Providing Flexible GPS Monitoring and Navigation" filed Jun. 14, 2002; U.S. Provisional Application No. 60/389,023 entitled "Preset Navigational Positions for Tracking Device" filed Jun. 14, 2002; U.S. Provisional Application No. 60/388,824 entitled "Navigational Information Based on Reverse Number Look Up" filed Jun. 14, 2002; U.S. Provisional Application No. 60/388,698 entitled "Entertainment System for Automotive Applications Including GPS and Telematics" filed Jun. 14, 2002; and U.S. Provisional Application No. 60/389,048 entitled "Telematics Systems" filed Jun. 14, 2002, all of which are incorporated herein by reference.

FIELD OF THE INVENTION

The present invention is directed to user interfaces and, more particularly to multifunctional user interfaces and methods that provide different media to different zones of a vehicle.

BACKGROUND

Users typically interact with computer systems by viewing data on display screens and selecting or inputting commands into the system. The display screens can typically display text, graphics, or a combination of text and graphics. Some systems use text to speech ("TTS") engines to provide auditory information to the user.

The rapid growth of the computer industry has introduced numerous functions into computer systems, particularly mobile computing systems. Vehicular computing systems have become increasingly more complex. In addition to radio tuners, compact disc ("CD") players, and cassette players, vehicular multimedia systems include navigational systems, communications systems and DVD players. The increase in multifunctional capability in mobile computing systems generally requires complex interfaces that require longer user-system interaction.

Multifunctional systems often require users navigate complicated menu structures and read complex textual information. Complex menu structures and textual data can cause longer driver-system interaction that in turn diverts a driver's attention from the operation of the vehicle to the operation of the mobile computer system. Diverting attention from operation of the vehicle increases the likelihood of an accident and risks the lives of the operator, passengers, pedestrians, and other vehicle operators. Currently available multifunctional systems do not provide an efficient or intuitive interface to the driver.

One available interface for a multifunctional system provides a common control that controls a number of functions, such as radio, disc player, navigation system and climate control. The problem with this interface is that commands are deeply embedded in a tree-structured menu. The user is required to search through the tree to locate the desired command. To enter a command associated with a different function, the user must back up through the tree to switch functions and then search through the tree to locate the command. This process is very tedious for the user and distracts the user's attention from the road.

Other interfaces provide separate controls for each function. These interfaces require a lot of space to accommodate all of the controls. The amount of space available on a mobile system is typically limited, which in turn limits the number of functions that can be supported. In addition, these interfaces are confusing to the user because the user has to search through a large number of controls to find the desired control.

Multizone systems provide different information or entertainment to different persons within a vehicle. For example, the driver in the front zone can listen to a CD, while a rear seat passenger in the rear zone listens to the radio. A multizone system includes a primary zone and one or more secondary zones. One available interface for a multizone system that supports two zones provides two displays, one for each zone. Each display provides information about the active mode for the corresponding zone. However, the use of two displays requires significant space and limits the number and arrangement of controls and/or devices provided with the interface. Moreover, if more than two zones are supported, then there may not be sufficient space in a mobile system to provide a display for each zone.

SUMMARY

The present invention meets the needs described above by providing an intuitive interface for a multifunctional system. The interface uses a combination of controls that retain essentially the same function throughout all modes and features and controls that vary based on the active mode or feature. A set of mode controls is provided so that the user can easily switch between modes. Multiple mode types are supported, such as long duration modes and short duration modes. Examples of long duration modes include broadcast content, such as radio, stored content, such as CD, and requested content, such as information services. Examples of short duration modes include communication, navigation and destination marking. In addition, a special restricted mode is also supported that temporarily disables some or all of the modes and features of the system. A mode may include one or more features. For example, the radio mode includes the following features: AM, FM, and satellite radio.

The interface also includes a display. The display may include a single display area or multiple display areas. If the display includes multiple display areas, then one of the display areas can provide text information while another display area provides graphic information. One of the display areas also can provide labels for the controls with variable functions. The two display areas may be located adjacent to one another. Alternatively, the two display areas may be separated and one of the display areas may be positioned in the instrument panel.

The interface provides soft controls that are arranged around the display so that the display can provide labels for the soft controls. The function of a soft control varies based on the active mode or feature. Not all soft controls are active in all modes or features. Even though the function of the soft controls depends upon the active mode or feature, there is some similarity in the manner in which the soft controls are used in the various modes and functions. This similarity makes it easier for the user to interact with the interface.

The interface uses lists and list modifiers in combination with the soft controls. The available lists and list modifiers depend upon the active mode or feature. However, the same set of soft controls are used to select a list modifier in all modes and the same set of soft controls are used to scroll through a list in all modes.

The interface provides feedback to the user in several forms. If the user interacts with the interface by activating a key, then the system may provide an audible clue, such as a click, indicating that the key has been activated. In addition, the system can repeat the user's input, so the user can confirm the input. The system can display text or a graphic that represents the user's input or use a text to speech ("TTS") engine to audibly repeat the user's input.

The system is designed to provide an intuitive interface to the user that minimizes the amount of user interaction required. For example, for those modes or features that require significant user interaction, such as communication or navigation, the system provides lists that can be used to select a called party or a destination, so that the user does not have to enter a complete address or telephone number. In addition, if the user has to enter a complete address, the system provides default values for street, city and state based on the vehicle's current position. By providing these default values, the amount of information required from the user is minimized.

The system interfaces with remote servers and databases using XML scripts. The use of XML scripts allows the system to interface with a large number of existing service providers, such as news providers. The use of XML scripts also allows easy upgrades or customization of the system.

The system also supports multizone systems by providing an interface with a single display and a zone control. The zone control allows the selection of an active zone. The remaining controls are used to select an active mode for the active zone and to control the features and settings for the active mode. The display provides information about the active mode for the active zone.

These and other aspects, features and advantages of the present invention may be more clearly understood and appreciated from a review of the following detailed description of the disclosed embodiments and by reference to the appended drawings and claims.

DETAILED DESCRIPTION

The present invention provides an intuitive interface for a multifunctional system that minimizes the amount of user interaction required. The interface uses a combination of mode independent controls that retain essentially the same function throughout all modes and features and mode dependent controls that vary based on the active mode or feature. A set of mode controls is provided so that the user can easily switch between modes. Multiple mode types, as well as multiple features within modes are supported.

The interface also includes a display. The display may include a single display area or multiple display areas. The display can provide text information, graphic information or a combination of text and graphics. The interface provides soft controls that are arranged around the display so that the display can provide labels for the soft controls. The function of a soft control varies based on the active mode or feature. The interface also provides lists and list modifiers for use in combination with the soft controls. The available lists and list modifiers depend upon the active mode or feature.

The interface supports different modes in different zones. For example, the driver can be listening to a CD, while one rear seat passenger watches a DVD and a second rear seat passenger listens to the radio. The interface provides a zone control for selecting an active zone. The controls select and control the active mode for the active zone and the display provides information about the active mode for the active zone.

The arrangement of the mode controls, the soft controls, the zone control and the display is designed to facilitate the user's interaction with the system. In addition, the selection and grouping of the controls are designed to make the system easy to use. The system provides some redundant controls so that the user can select the control that is most convenient or intuitive for that user.

User Interface

Figure 1:
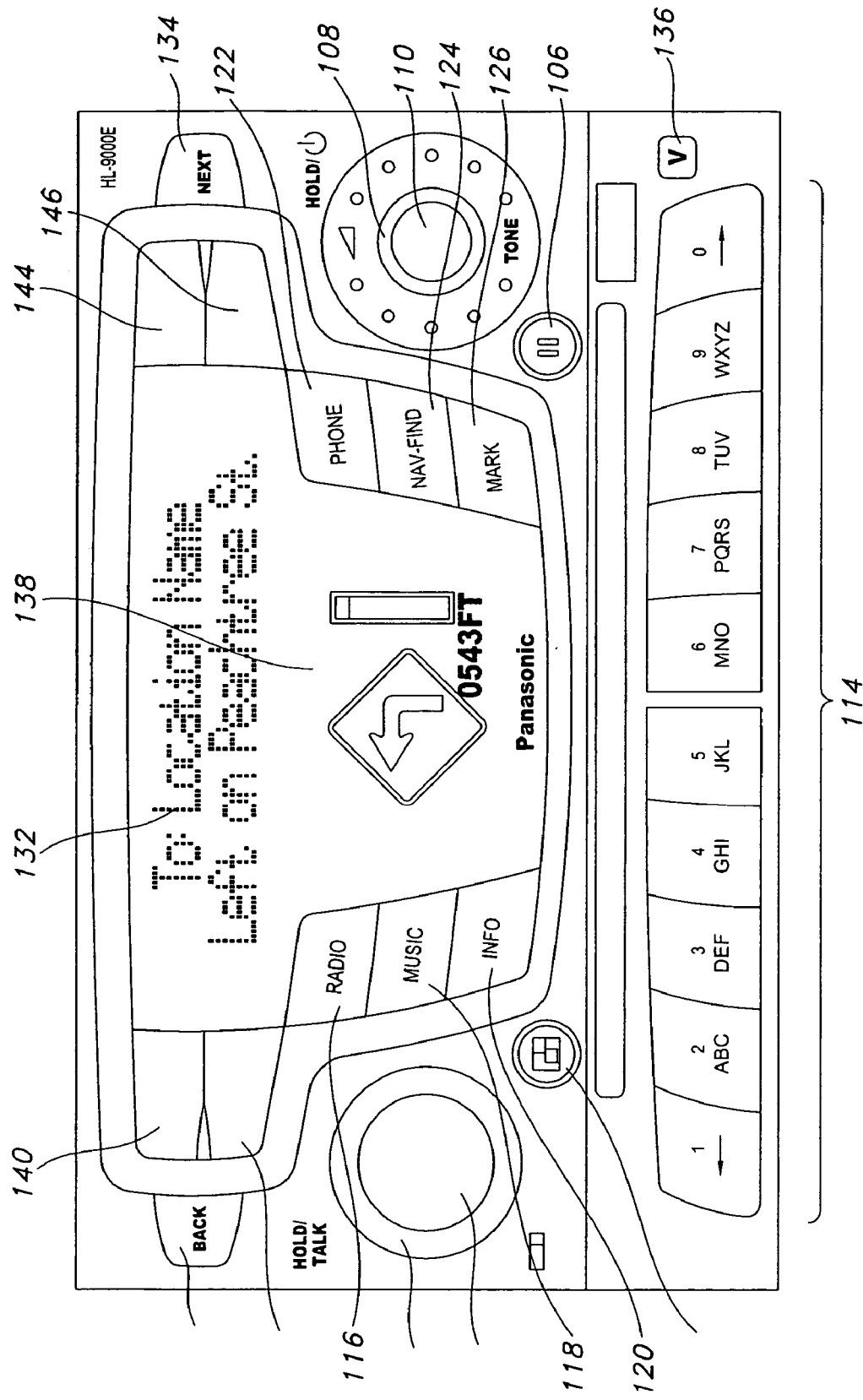
FIG. 1 illustrates an exemplary interface panel for use in accordance with an embodiment of the invention.

FIG. 1 depicts an exemplary interface. The interface can be installed in a vehicle. The interface includes a display and a number of controls. In one embodiment, the display includes a first display area 132 and a second display area 138. The first display area provides text information. The text information includes labels for soft controls, lists, list modifiers, descriptive text, and prompts. The first display area can use different colors to denote the different types of text being displayed. A variety of fonts and sizes can also be used to assist the user in distinguishing between different types of text information.

The second display area provides graphical information. The graphical information includes mode or feature icons, informative logos and navigational icons. In some instances the graphical information provides similar information as that provided by the text in the first display area. In other instances the graphical information provides additional information. The system can allow for simple transitions such as fades and wipes when switching between images. The system can also display animated images. Exemplary image formats include, but are not limited to, GIF, TIFF, MPEG and JPEG.

A variety of display arrangements are possible. In one embodiment, the first display area corresponds to one type of display, such as a Vacuum Fluorescent Display ("VFD"), and the second display area corresponds to a second type of display, such as a Liquid Crystal Display ("LCD"). In another embodiment a single display is used that provides a first display area and a second display area. In yet another embodiment, the second display area is positioned on the instrument panel. In some embodiments, only a single display area is used. If so, then the information displayed on the single display can be text information or a combination of text and graphical information. If only a single display area is used, then the display area may display the information described herein as associated with the first display area, the second display area or a combination of the information displayed on the two display areas.

The controls are strategically placed near the display, as shown in FIG. 1. By placing the controls near the display, user-system interaction is more efficient because a user can select a control near the data display to scroll through data, select a specific data item, or change functions. The user need not divert the user's attention from the data because the controls can be in the user's field of view. Thus, a user can comprehend displayed data and make corresponding data selection at a single glance. The reduced time focused on the data display enables the user to devote more time to operating the vehicle, thereby reducing the chance of having an accident.

The terms control, button and key are used interchangeably herein to refer to any type of input device including, but not limited to, a dial, button, key or pressure sensitive screen. The terms soft control, soft button and soft key refer to a control with a function that varies based on the active mode or feature. Typically, a label, symbol, icon or other indicator indicates the current function corresponding to a soft control. FIG. 1 illustrates four soft controls 140, 142, 144, 146 located proximate to the first display area. The current function of a soft control is indicated by a label, symbol or icon shown on the display adjacent to the soft control. If the soft control is not functional in a particular mode, then the display is blank next to the soft control. FIG. 1 illustrates the use of a portion of the first display area for soft control labels. In FIG. 1, the soft controls are used for scrolling and arrows representing the scroll direction are displayed next to the soft controls. Other embodiments may use a different number or placement of the soft controls or a different manner of providing an indication of the control's function.

FIG. 1 also illustrates a number of mode controls 116, 118, 120, 122, 124, 126, a special restricted mode control 136, a self-centering jog dial 102, a confirmation control 104, a rotary encoder 108, 110, a number of preset controls 114, a back control 128, a next control 134, a pause control 106, an eject control 112 and a recall control 130. Other embodiments may include additional or fewer controls and the controls may be arranged differently. A control can provide a consistent function in all modes and features or can provide a variable function depending upon the active mode and feature. Moreover, a control can provide a different function depending upon how it is activated. Pushing and holding a control may provide a different function than simply pushing and releasing the control. Similarly, turning a control hard or turning and holding a control may provide a different function than simply turning and releasing the control.

The exemplary mode controls shown in FIG. 1 correspond to a broadcast content mode 116, a stored content mode 118, a requested content mode 120, a communication mode 122, a navigation mode 124 and a destination mark mode 126, as well as a restricted mode 136. The broadcast content mode provides access to broadcast content, such as radio. The stored content mode provides access to content stored in memory or on disc, such as a music CD. The requested content mode provides access to content that can be obtained via a query, such as content available on the Internet. The communication mode provides communications service, such as cellular telephone service. The navigation mode provides route guidance and navigation services. The mark mode allows the user to mark locations so that the marked locations can be used with the navigation services. The restricted mode allows the user to place restrictions on the vehicle so that the user is notified if the vehicle exceeds certain predetermined parameters. For example, the user is notified if the vehicle strays from a predetermined area or exceeds a predetermined speed.

There may be multiple features within a mode. For example, the broadcast content mode includes a number of features, such as AM radio, FM radio, and satellite radio. The stored content mode supports a number of formats, such as CD, DVD and MP3. The communication mode includes a number of features, such as phone by name, phone by number, and voice mail. The navigation mode includes a number of features, such as navigation by address, navigation by phone number, navigation by name and navigation by place.

If there are multiple features within a mode, then repeatedly activating the mode control cycles through the features. Pushing and holding a mode control initiates the setup option for the corresponding mode. The setup option allows the user to establish settings for the mode, as well as some system settings.

Modes may be of different types. In one embodiment, the mode types include long duration and short duration. Long duration modes are those that the user typically activates for a relatively long period of time. Short duration modes are those that the user typically activates for a relatively short period of time. Broadcast content, stored content, and requested content are long duration modes. Communication, navigation and mark modes are short duration modes. In one embodiment, if the user changes modes from a long duration mode to a short duration mode, then the system automatically returns to the previously selected long duration mode once the activity associated with the short duration mode is completed. For example, if the user switches from the stored content mode to the communication mode to place a telephone call, then once the call is completed, the system automatically returns to the stored content mode and begins playing the stored content from the point it was playing when the communications mode was activated.

Figure 2:
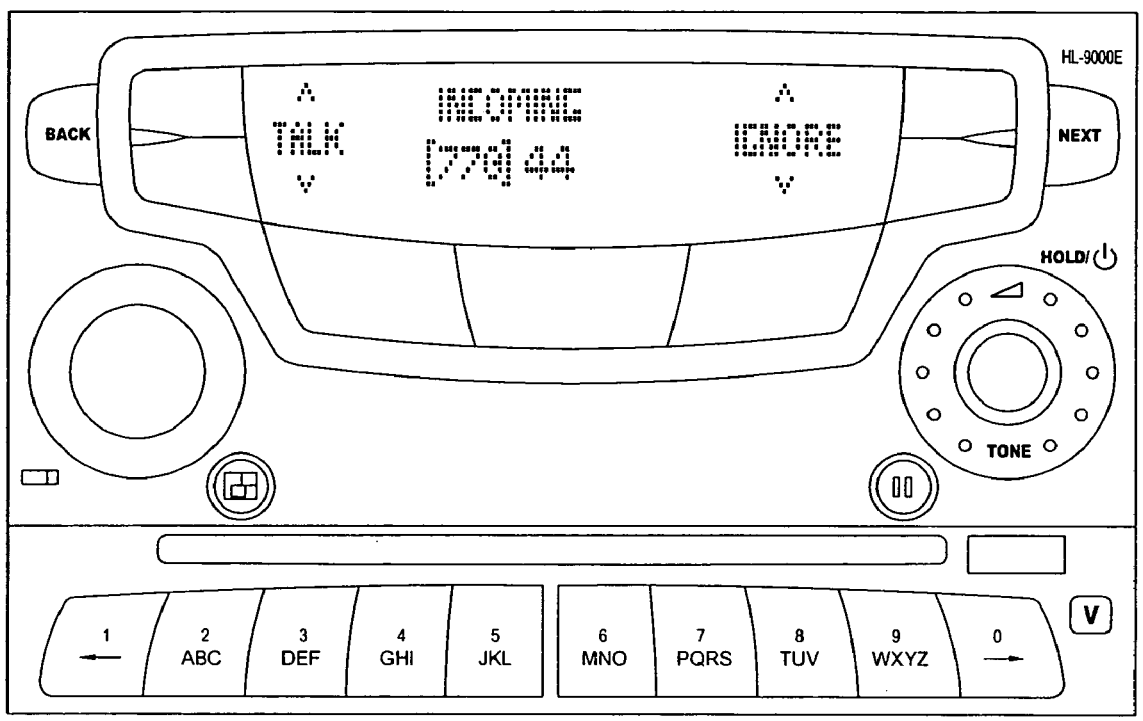
FIG. 2 illustrates an exemplary interface panel for use in accordance with another embodiment of the invention.

Additional or fewer modes and features may be provided in other embodiments. For example, FIG. 2 illustrates an embodiment in which only the broadcast content, stored content and communication modes are available. Other embodiments may include modes for front seat functions and rear seat functions or for vehicle control functions.

In one embodiment, the controls are organized by function. As shown in FIG. 1, the soft controls are arranged near the first display area and the mode controls are arranged near the second display area. Moreover, the long duration mode controls are located on the one side of the second display area and the short duration mode controls are located on the other side of the second display area. Although FIG. 1 illustrates that the long duration mode controls are located on the left-hand side and the short duration controls are located on the right-hand side, the controls can be located on either side. In addition, the restricted mode control is located apart from the other mode controls so that it is less likely that the user will activate this control unintentionally.

The jog dial or select control 102 can be used to navigate within feature prompts. The select control can be used to scroll through lists of data, such as street names, or adjust a radio station frequency. In one embodiment, the select control is a self-centering (spring loaded) dial with multiple contact locations. The contacts allow the system to determine the speed and acceleration at which the dial is activated. This allows the jog dial to perform different functions depending on the amount it is turned and whether it is immediately released or held for a set duration.

In one embodiment, the select control surrounds the confirmation control 104. The confirmation control can be used to confirm a user's selection or entry. The function associated with the confirmation control can change depending on the active mode and feature. For some modes or features, the confirmation control duplicates the functions of another control, such as the next control 134 or soft control 142. Depressing and holding the confirmation control activates a speech recognition function that allows the user to use verbal commands to interface with the system.

The next 134 and back 128 controls can be used to navigate through mode or feature prompts. If the user has keyed-in text within a prompt, pressing the back control removes the last entered character. If a prompt has no keyed-in text, the back control returns to the last prompt. The next and back controls can also be used in the stored content mode to switch between tracks, such as tracks of a CD, or in the broadcast content mode to switch between radio stations.

The preset controls 114 include controls for storing and accessing preset information, as well as entering alphanumeric information. Depending upon the mode or feature, the preset controls default to letter entry or number entry.

The rotary encoder 108 is used to control the volume, audio controls and power. In one embodiment, the rotary encoder is free spinning with no stops and a single step push button 110. Turning the encoder one way adjusts the output volume up and turning the encoder the other way adjusts the output volume down. The system can support multiple audio output sources having independent volume settings, as well as multiple audio output sources controlled by a universal volume setting. For example, the broadcast content and stored content modes can use a universal volume setting, whereas the Text To Speech ("TTS") function, telephone ringer, telephone voice and audible tone features can have independent volume settings.

In one embodiment, pressing and releasing the encoder enters the audio control menu. Once in the audio control menu, repeatedly depressing the encoder cycles through the audio control menu options. Exemplary options include: balance, fade, treble, mid range and bass. Once in an audio control menu option, turning the encoder adjusts the value for the selected option. The display can provide a visual representation of the current settings to assist the user in making adjustments. The system can be powered on or off by depressing the encoder.

An optional pause control 106 can be used to pause certain audio outputs of the system, such as the output of the broadcast content, stored content or requested content modes. If the content is stored, the system can terminate the playback and mark the termination location. When the pause control is pressed a second time, the system can return to the marked location and reactivate the playback. In the broadcast content mode, the system can use an internal digital storage medium to cache the data until the pause control is pressed again.

In some instances multiple modes are active concurrently. In these situations, the recall control 130 is used to switch between the modes. For example, if the navigation mode and the stored content mode are both active, then the user can toggle between the two modes using the recall control instead of using the mode controls.

Feedback tones confirm the user's activation of the controls. For example, a tone can be provided whenever the user activates and releases a control and a different tone can be provided whenever the user activates and holds the control. The tone can vary based upon the active mode or feature.

The interface can present information to the user in multiple formats. For example, text describing a location may be displayed in the first display area, a logo associated with the location may be displayed in the second display area and audio describing the location may be output using the TTS function.

Soft Objects

A number of soft objects are used to provide mode-specific controls. As used herein the term soft object includes soft control labels, lists and list modifiers that are mode and/or feature dependent. The soft control labels provide labels, symbols or icons that identify the current function of the soft controls. A list modifier identifies the type of list or the order of the list presented to the user. Typically, soft controls allow the user to scroll through and select a list modifier or an item from a list.

Typically, list modifiers are displayed consistently on one side of the display and lists are displayed on the other side of the display. In addition, the same controls are used to scroll through and select a list modifier or an item from a list. The use of a common list modifier interface and a common list interface provides an interface that is intuitive to the user. In the embodiment described herein the list modifiers appear on the right-hand side of the display and the lists appear on the left-hand side of the display.

Adaptive Interface

The system determines which features are supported and adjusts the prompts and options provided to the user accordingly. Thus, the same system can support an embodiment with one, some or all of the modes described herein. For example, if a particular vehicle model only offers the broadcast content mode, the stored content mode and the communication mode, then an interface panel such as the one shown in FIG. 2 may be installed. The system detects the type of interface panel installed and adapts accordingly. Moreover, different purchasers may elect to use different features. A first user may subscribe to satellite radio, whereas a second user may not. In these situations, the system identifies the supported features and modes by determining what modes are supported by the interface panel and what features the user has activated. The system will display the satellite radio feature to the first user, but not the second. In this manner, the same system can be used to support a wide variety of installations.

Mode Controls

As described above the interface includes multiple mode controls. These mode controls are always available to the user and provide a flat menu structure. The flat menu structure allows the user to easily select a mode or switch modes by selecting the desired mode control. The user is not required to back up through a tree-structured menu, as required by some currently available interfaces.

When the user switches from one mode to another mode, the first mode is either paused or deactivated. In one embodiment, if the user switches from a long duration mode, such as the stored content mode, to a short duration mode, such as the communications mode, then the long duration mode is paused at an interrupt point and the short duration mode is activated. Once the user has finished using the short duration mode, the system automatically reactivates the long duration mode at the interrupt point. For example, the interrupt point may correspond to a particular point in a particular track of a CD so that the system stops playing the CD at that point. Once the stored content mode is reactivated, the system starts playing the CD from the interrupt point so that the user is able to hear the entire track. In some embodiments, if the user switches from the broadcast content mode to a short duration mode, then the broadcast content is cached. However, in other embodiments, the broadcast content is not cached.

If the user switches between long duration modes, then the first long duration mode is deactivated once the second long duration mode is selected. The following sections provide additional details about the various modes.

Broadcast Content Mode

The broadcast content mode provides broadcast content, such as radio. The broadcast content mode supports a number of features, including AM radio, FM radio, and satellite radio. Enhanced AM/FM radio is an optional sub-feature of the AM and FM radio features.

To enter the broadcast content mode from another mode, the user selects the broadcast content control. If the user has previously used the broadcast content mode, then the previously selected feature is activated. If the user has not previously used the mode, then a default starting feature is activated. The user can cycle through the available features by repeatedly activating the broadcast content mode control.

Figure 3A:
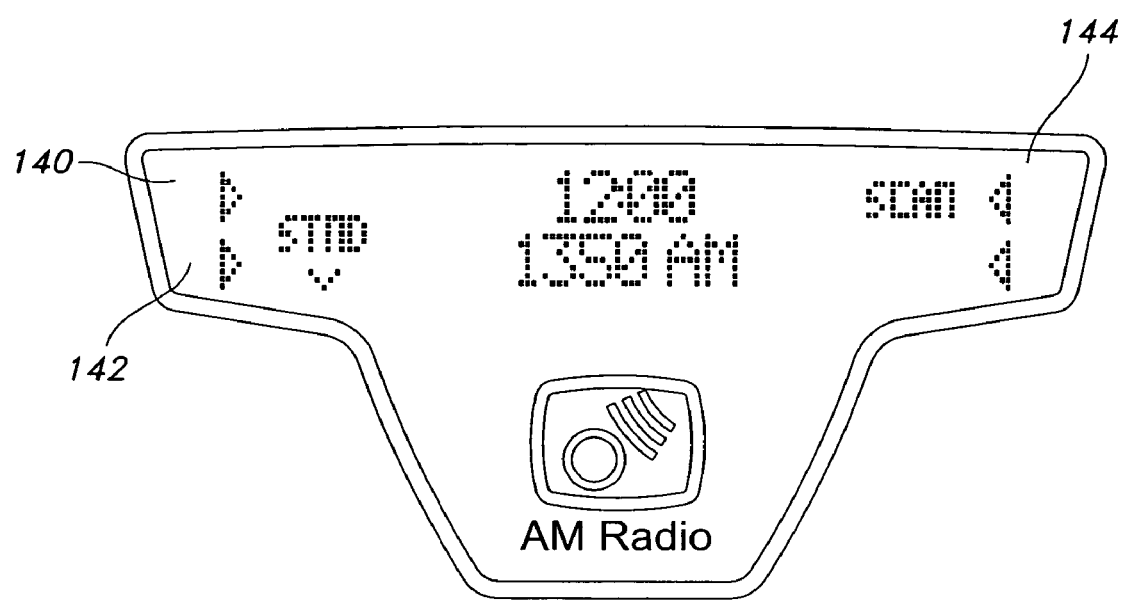
FIGS. 3A and 3B illustrate exemplary display screens and exemplary soft controls for a broadcast content mode in accordance with an embodiment of the invention.
Figure 3B:
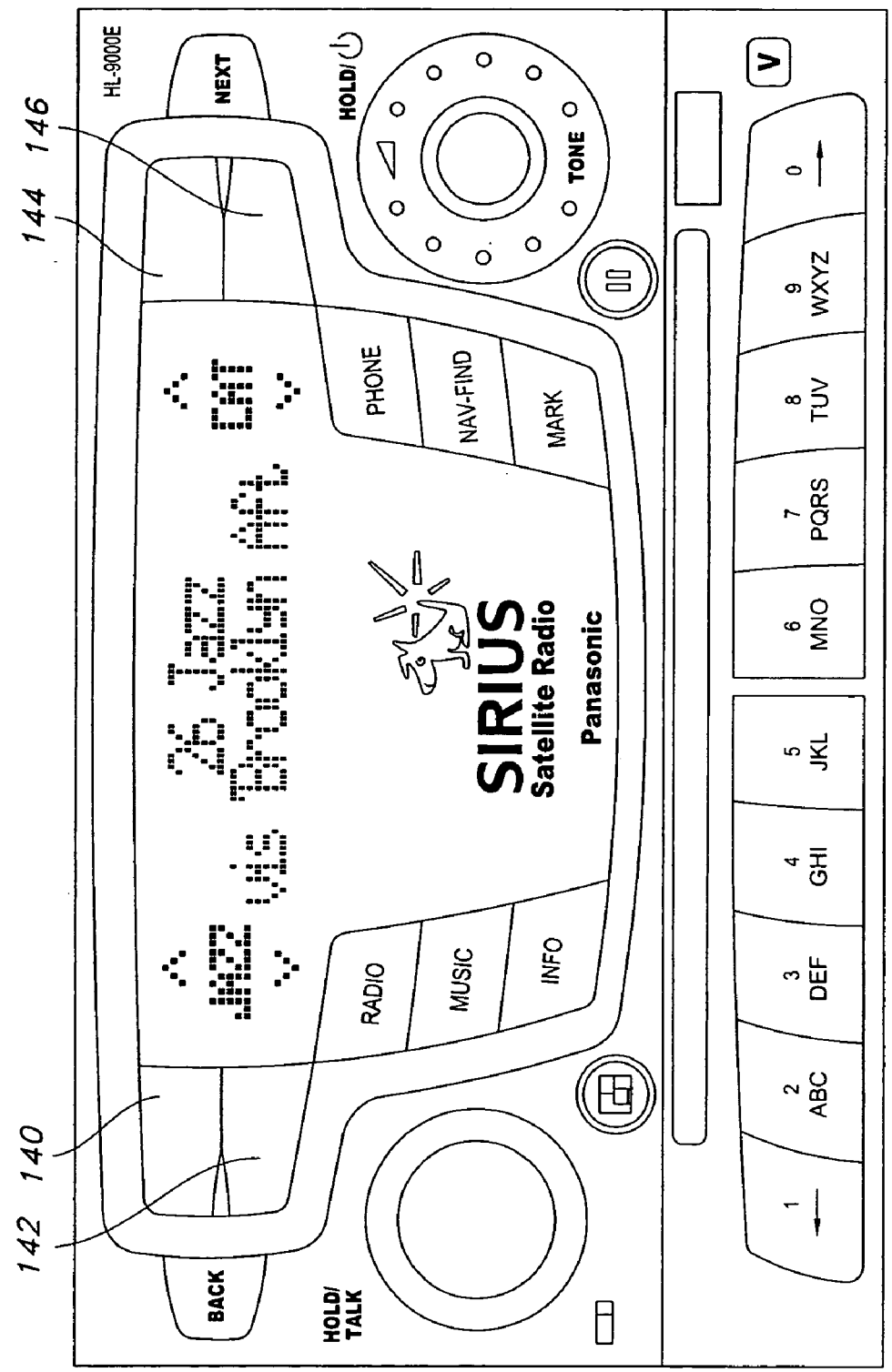

FIGS. 3A and 3B illustrate exemplary display screens and exemplary functions for the soft controls for the broadcast content mode. The first display area includes information about the broadcast, such as station frequency or number, or artist and title, and the second display area indicates the active feature or sub-feature by displaying an appropriate icon.

For the AM radio and FM radio features (including enhanced AM/FM radio) one of the soft controls, such as soft control 144 provides a scan function. A pair of soft controls, such as soft controls 140 and 142, allows the user to scroll through a sub-feature list and select a sub-feature. In the embodiment illustrated by FIG. 3A, the sub-feature list includes "stnd" for AM radio or FM radio and "plus" for enhanced AM/FM radio.

For satellite radio, a pair of soft controls, such as soft controls 144 and 146, allows the user to scroll through the list modifiers that correspond to sort criteria. The sort criteria include genre, category and channel. Another pair of soft controls, such as soft controls 140 and 142, allows the user to scroll through a list and select a particular genre, category or channel. For example, if category is selected, then the user can scroll though a list that includes categories, such as blues, classical, country, jazz and rock. See FIG. 3B.

In the broadcast content mode, the select control allows the user to select a frequency or channel by turning the dial or via a seek function by turning the dial hard or by turning the dial and holding the dial. The seek direction is determined by the direction the dial is turned. Alternatively, the user can use the back and next controls to seek.

The preset controls allow the user to set and access selected frequencies or channels. Activating and releasing a preset control selects the corresponding frequency or channel. Activating and holding a preset control sets the preset control to the currently selected frequency or channel.

Stored Content Mode

The stored content mode provides stored content, such as music, video or other information. The stored content mode supports a number of media formats, such as CD, DVD and MP3. Rear seat entertainment is an optional feature that allows control of an independent rear seat entertainment system.

To enter the stored content mode from another mode, the user selects the stored content control. The system automatically detects the format of the stored media and begins to play the stored content. If the user has previously used the stored content mode, then play begins where it previously left off. If the user has not previously used the stored content mode or if a new disc has been loaded, then play begins at a default starting point or a previously defined starting point, if one has been defined.

As will be apparent to those skilled in the art, multiple media players can be supported by the system. If so, then different features can be associated with each media player. For example, if the system supports both discs and SD memory cards, then one feature is associated with the disc player and another feature is associated with the SD memory card player. If multiple features are supported, then the previously selected feature is activated when the stored content mode is activated. If the user has not previously used the stored content mode, then a default feature is activated. The user can cycle through the available features by repeatedly activating the stored content mode control.

Figure 4A:
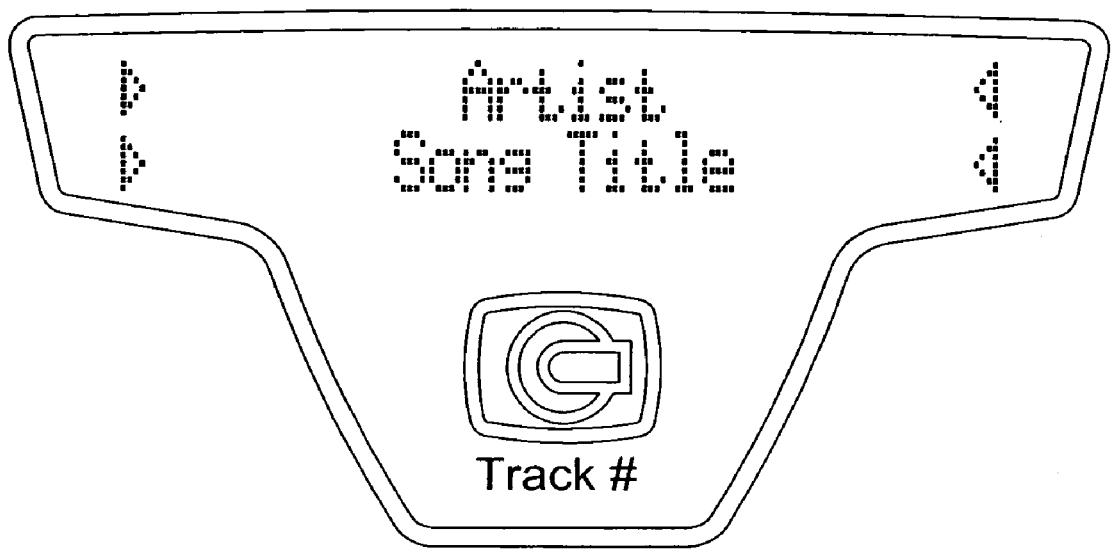
FIGS. 4A and 4B illustrate exemplary display screens and exemplary soft controls for a stored content mode in accordance with an embodiment of the invention.
Figure 4B:
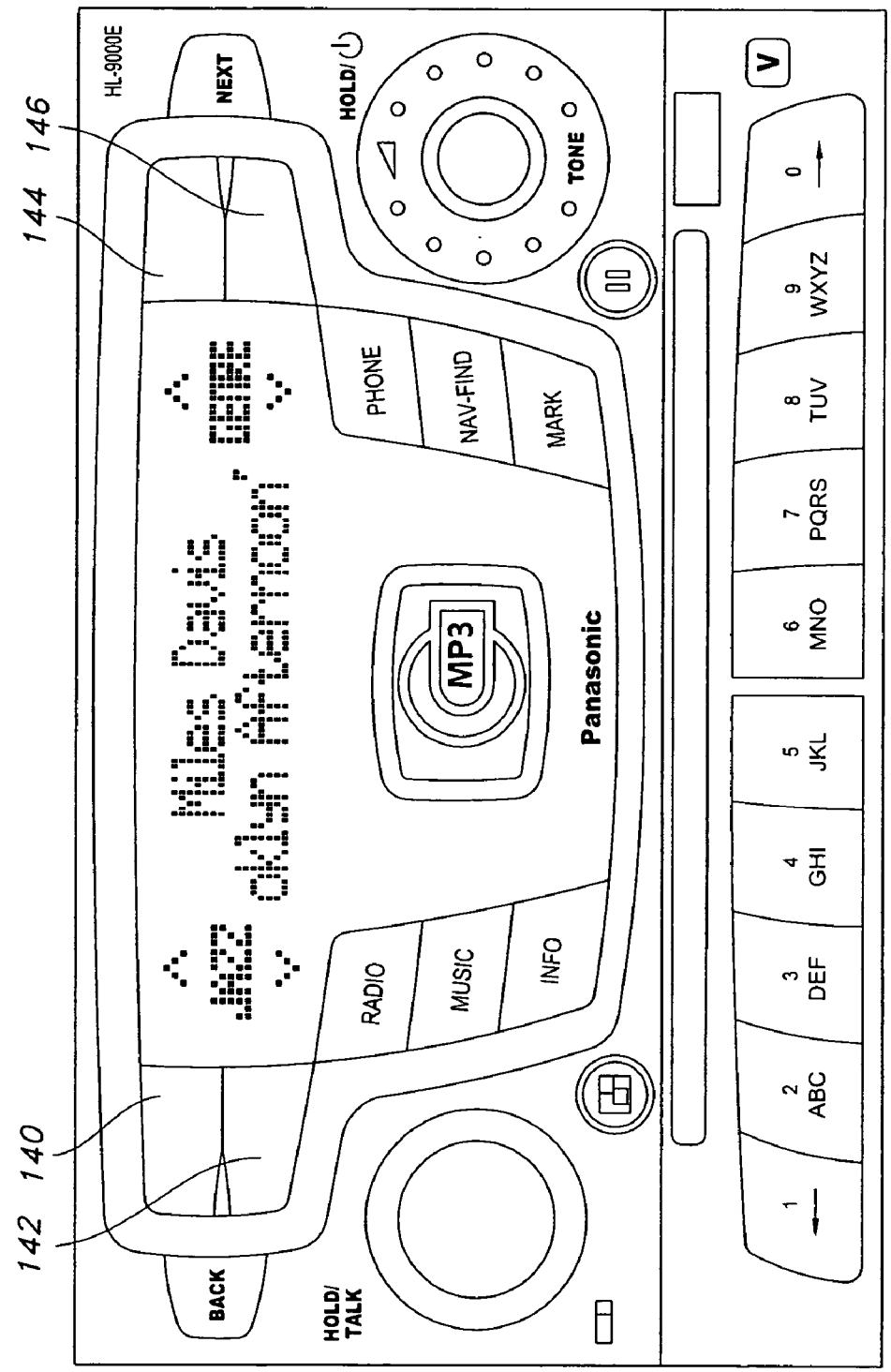

FIGS. 4A and 4B illustrate exemplary display screens and exemplary functions for the soft controls for the stored content mode. FIG. 4A illustrates an exemplary display for playing a CD. In some embodiments, the first display area displays information about the content, such as the artist and song title of the current track. In other embodiments, the first display area is blank. The second display area displays an icon indicating the track number and the format of the stored content or possibly cover artwork. If the system can access a remote server, then information about a CD track, such as artist and song title, as well as cover artwork can be obtained from a music information database, such as the one available at CDDB.com.

FIG. 4B illustrates an exemplary display for playing an MP3 formatted disc. The first display area displays information, such as the artist and song title of the current track, and the second display area displays the track number and the format of the stored content. The displayed information can be obtained from the track tag information on the disc.

A pair of soft controls, such as soft controls 144 and 146, allows the user to scroll through the list modifiers. Another pair of soft controls, such as soft controls 140 and 142 allows the user to scroll through the list that corresponds to the selected list modifier.

The system can read and use play lists recorded on the disc. If a play list is present, then the sort mode is determined by the play list. If there are multiple play lists, then the user can select a play list by selecting the list modifier that corresponds to play list so that the play lists are presented to the user in a list. The default is to play the play list that would appear first in an alphabetical list. The user can scroll through the play lists using a pair of soft controls, such as soft controls 140 and 142, or the select control. If there are no pre-recorded play lists, then the list modifier defaults to "all" and an alphabetical list of tracks is presented to the user.

The user can create a custom play list using the lists and the list modifiers. Typical list modifiers include album, artist, genre, play list, and all. The user selects one of the modifiers and then creates a custom play list by selecting from the appropriate list. An example would be to organize the tracks by "genre" and play only tracks in the "rock" genre. To create a play list with only rock selections, the user selects the list modifier for "genre" and then selects "rock" from the list. The play list is generated based on the content of all the track tags and play lists on the disc. However, if the "all" modifier is selected, then the user can select from a sort list that includes alphabetical, artist, album and genre. If alphabetical is selected, then all of the tracks on the disc are played in alphabetical order. If artist, album or genre is selected, then the tracks are alphabetized first by artist, album or genre and then by tracks. If the user selects a pre-recorded play list or creates a custom play list, then that play list becomes the default for the disc.

The select control allows the user to select a track or move through a track. Turning the select control in one direction allows the user to select the previous track. Turning the select control in the other direction allows the user to select the next track. Alternatively, the user can use the back control to select the previous track or the next control to select the next track. Turning the select control hard in one direction allows the user to select the first track. Turning the select control hard in the other direction allows the user to select the last track. Turning and holding the select control allows the user to fast forward or rewind through the current track depending upon the direction the control is turned.

The preset controls allow the user to select a track. If a preset control is activated and released, then the track corresponding to the number associated with the control is selected. For example, activating and releasing the control associated with "1" selects the first track. If a preset control is activated and held, then the track corresponding to ten plus the number associated with the control is selected. For example, activating and holding the preset control associated with "1" selects the eleventh track.

Requested Content Mode

In the requested content mode, the system requests content from an external source, such as a database, the Internet, a web server or other source that provides content. In one embodiment, the system uses a wireless communication device to communicate with the external source. The requested content is typically organized into two types of content. The first type of content provides information, such as news, traffic and weather, and the second type of content provides information, such as local entertainment schedules and e-mail. Some embodiments provide both types of content, while other embodiments provide only one type of content. The content is read to the user by a TTS engine. TTS engines are known to those skilled in the art and are commercially available.

The user defines the features and available content for the requested content mode. Typically, the user subscribes to one or more information services to obtain the content. In one embodiment, the user defines topics, subtopics, TTS settings and reading parameters in the requested content set-up mode. In another embodiment, the user defines topics, subtopics, TTS settings and reading parameters via a web page. The available topics and subtopics are typically defined by the information service. The user decides which topics and subtopics to include and which topics to exclude.

The content can be hierarchically organized. For example, in addition to the two types of content described above, the content can also be organized by topics and subtopics. For example, a news topic may include subtopics for top stories, world news, local news, business news, sports news, health news, etc. An e-mail topic may include subtopics for the user's various e-mail accounts.

A pair of soft controls, such as soft controls 144 and 146, allows the user to scroll through list modifiers. In one embodiment, the list modifiers include topics and subtopics. The select control allows the user to select an article from a list. Turning the select control in one direction allows the user to select the previous article. Turning the select control in the other direction allows the user to select the next article. Alternatively, the user can use the back control to select the previous article or the next control or confirmation control to select the next article.

The TTS settings include a vocal setting that allows the user to select a voice with specific vocal characteristics for the TTS engine. The reading parameter determines how the system outputs the content associated with the topics and subtopics to the user. In one embodiment, the reading parameter defaults to reading all articles by subtopic and topic. For example, the system reads an article from the active topic/subtopic. When that article has been read, the system pauses, and then begins reading the next article. When all of the articles in the subtopic have been read, the system proceeds to the next subtopic, reads the subtopic heading and then begins reading the articles in that subtopic. When all of the subtopics in the active topic have been read, the system advances to the next topic, reads its heading, reads the first subtopic heading, then reads the first article in that subtopic. However, the user can alter the reading parameter so that the system will stop reading after each topic or subtopic. Once stopped, the system can either wait for additional instructions or return to the previous mode or feature. If the user only receives traffic or weather information, then the user may desire that the system return to the previous mode or feature after reading a topic or subtopic. In this manner, the user could activate the requested content mode control from the stored content mode to listen to a traffic report, and then the system would automatically return to the stored content mode. The reading parameter can be set one way for the first type of content (e.g. news, traffic, weather) and a different way for the second type of content (e.g. local entertainment schedules, e-mail).

In one embodiment, the requested content can be presented in multiple forms, such as headlines and full stories. The headline form typically includes the headline of an article and a few paragraphs, usually the first one or two paragraphs. The full story form typically includes the headline and the entire article. The user can seamlessly switch between the forms. If the user switches from one form to another form while an article is being read, then the system determines whether to switch with the current article or the next article. For example, if the user switches from the headline form to the full story form, then the system continues reading the entire article. If the user switches from the full story form to the headline form, then the system determines whether it has past the end point for the headline form. If so, then the system maintains the full story form for the current article and switches to the headline form for the next article. If not, then the system switches to the headline form for the current article.

Figure 5:
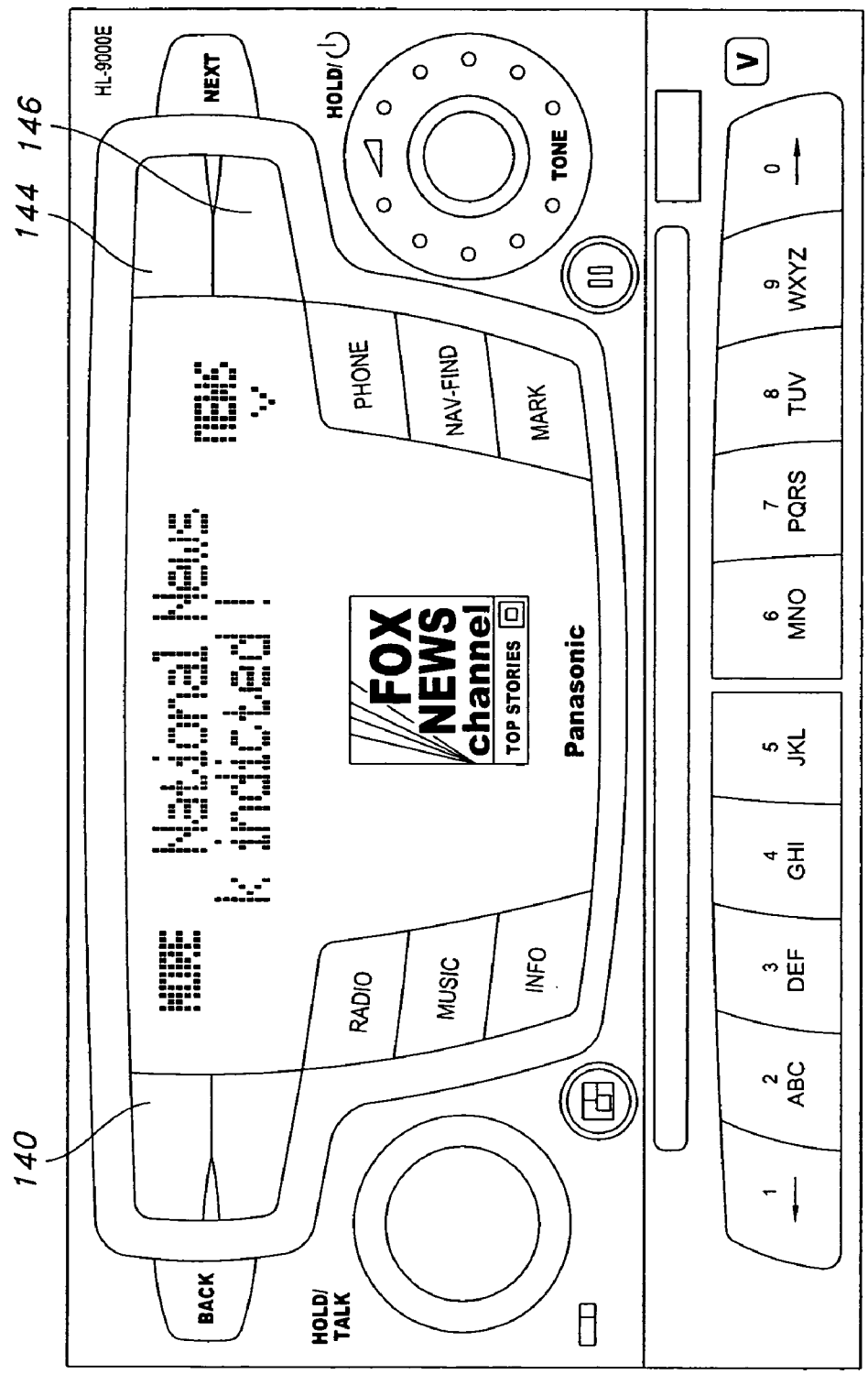
FIG. 5 illustrates an exemplary display screen and exemplary soft controls for a requested content mode in accordance with an embodiment of the invention.

One of the soft controls, such as soft control 140 allows the user to switch between forms. In one embodiment a single control can operate as a toggle between two forms. In other embodiments, a pair of soft controls allows the user to scroll through a list of forms. FIG. 5 illustrates an exemplary embodiment where soft control 140 is used as a toggle between the full story form (labeled "more") and the headline form (labeled "less").

The system determines the active item or starting point for this mode based on past use or a default, if no previous use with the current topics and subtopics. If the mode has not been used before or the user requests a different set of topics, then the system defines the first topic and its first subtopic to be the active topic and subtopic. Once the mode has been activated, the active topic and subtopic become the current topic and subtopic. If the user leaves the mode and then returns later, the system begins where the user left off, unless the articles in the active subtopic have been updated, in which case, the system begins with the first article in the active subtopic.

The information service can provide graphic icons representing the content source for each topic and subtopic, such as icons for a national news source, local news source, weather source and traffic source. These icons can be displayed in the second display area to assist the user in navigating through the topics and subtopics. The icon shown in FIG. 5 corresponds to a news source. In addition, the graphic icons can convey content. For example, if a weather source is providing content, then a graphic indicating the current conditions, such as a cloud with a temperature reading, can be displayed. FIG. 5 also illustrates that the topic or subtopic, as well as the headline, is displayed in the first display area.

The icons also provide an opportunity for self-promotion or advertising space for the content provider. An advertiser could pay the content provider to provide an advertisement along with the content. The advertisement could be based on the type of content provided. For example, if the user was listening to a baseball game, then an advertisement for an upcoming game or baseball cap could be provided. The advertising revenue could be used to offset the cost of providing the content to the user.

Communications Mode

The communications mode allows the user to communicate outside of the vehicle, typically via a cellular telephone or other wireless device. The wireless device can be a dedicated device or can be a removable device. In either situation, the user can interact with the interface without the need to access the keypad of the device. In one embodiment, the communications mode includes a number of features, including phone by name, phone by number and voicemail. Other embodiments can include different types or numbers of features.

To enter the communications mode from another mode, the user selects the communications control. If the user has previously used the communications mode, then the previously selected feature is activated. If the user has not previously used the mode, then a default starting feature is activated. The user can cycle through the available features by repeatedly activating the communications mode control.

Figure 6A:
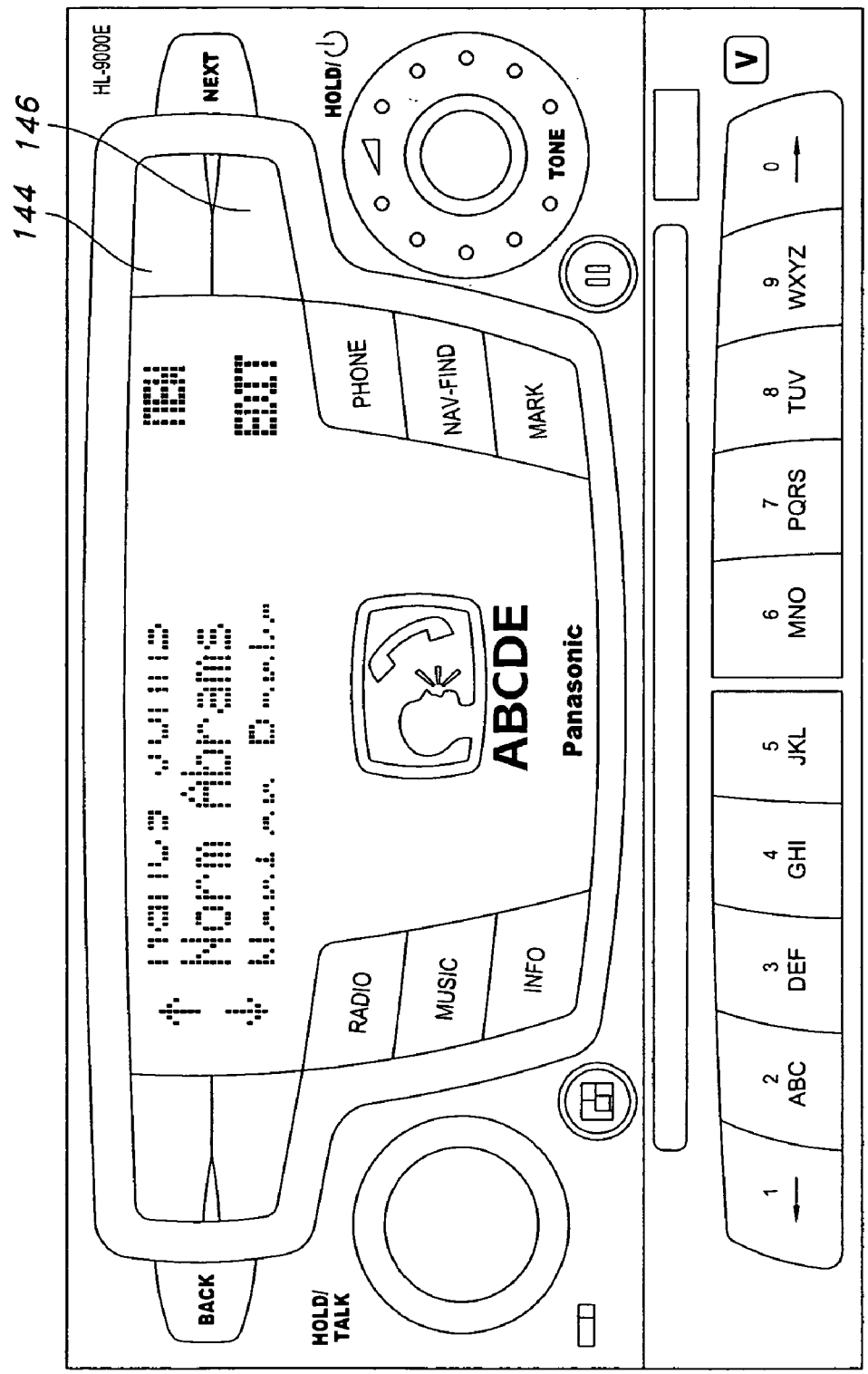
FIGS. 6A, 6B and 6C illustrate exemplary display screens and exemplary soft controls for a communications mode in accordance with an embodiment of the invention.
Figure 6B:
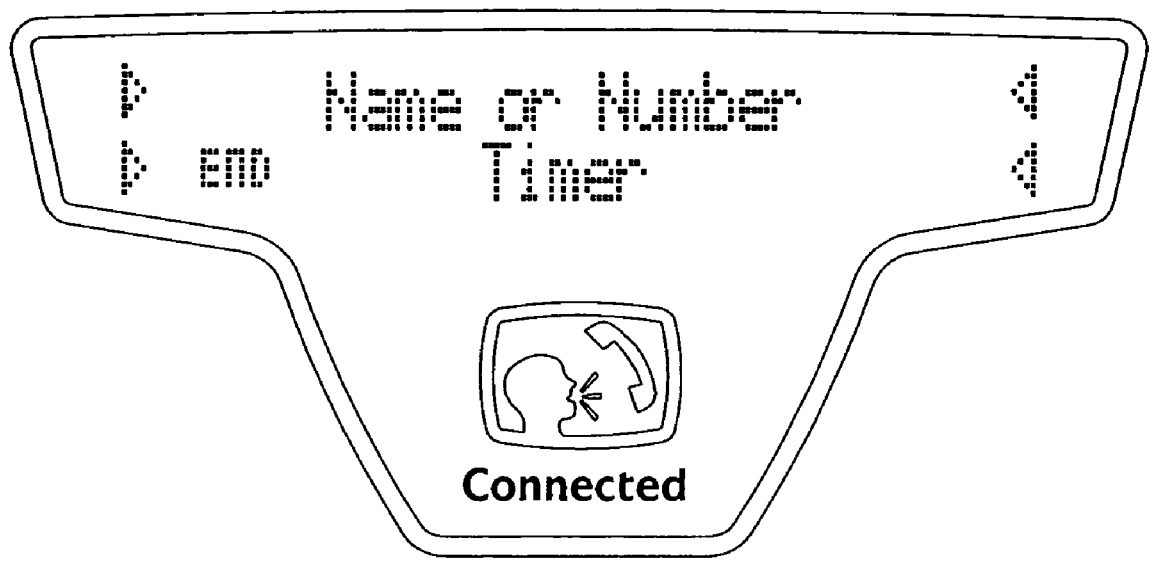

The phone by name feature allows the user to place a call by selecting a name from a phone book. The phone book can be obtained from an attached device. Upon activation of the phone by name feature, the system displays the phone book. In one embodiment, the names are displayed in a list in the first display area. The first name displayed is either the last name called or the first name in the list alphabetically. Typically, the list is ordered alphabetically. However, other organizations can also be used. The user can scroll through the phone book using a pair of soft controls, such as soft controls 140 and 142. Alternatively, the user can scroll through the phone book using the select control. The user can add an entry by selecting one of the soft controls, such as soft control 144, or edit an entry by selecting a different soft control, such as soft control 146. The preset controls are used to add or edit entries. See FIG. 6A. Once the user has located the desired name, the user selects a name from the phone book using the confirmation control or the next control and the system connects the call.

The phone by number feature allows the user to place a call by entering a telephone number. The user can enter the telephone number using the preset controls. The numbers are displayed as the user enters the numbers. In addition, the TTS engine states each number as it is entered. The user can erase a number using the back control.

The called party's name, in the case of phone by name, or the called party's number, in the case of call by number, is displayed in the first display area for the duration of the call. In addition, a duration timer may also be displayed. See FIG.

6B. The user can end the call by selecting the confirmation control or one of the soft controls. Upon completion of the call, the system returns the user to the previous long duration mode.

Figure 6C:
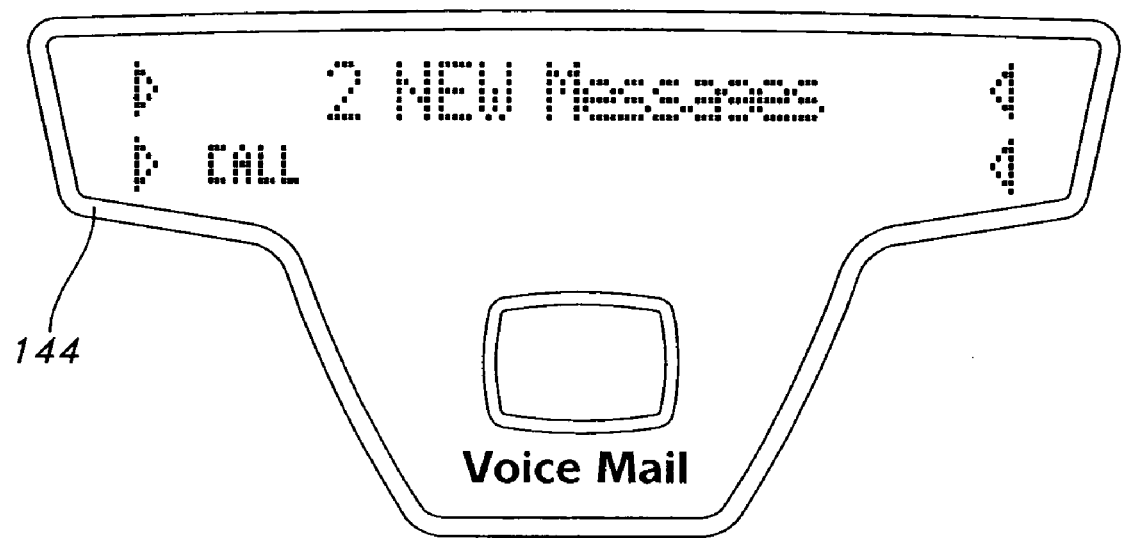

The voice mail feature allows the user to retrieve voice mail from an attached cellular telephone. If messages are available, then the user is notified via a message, such as the message shown in FIG. 6C. In addition, an announcement or audible clue may also be generated. The user can access voice mail by selecting one of the soft controls, such as soft control 142, or the confirmation control. If new messages are present, then the voice mail message overrides the other displays in the communication mode. The override is removed if the user selects a control other than one of the voice mail access controls.

Communications Interrupt

Figure 7A:
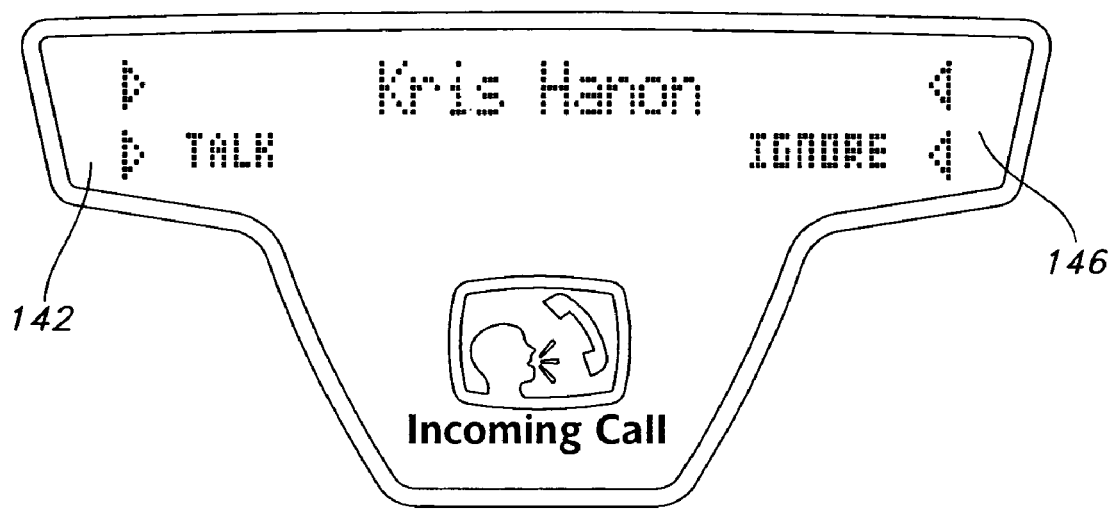
FIGS. 7A and 7B illustrate exemplary display screens and exemplary soft controls for a communications interrupt in accordance with an embodiment of the invention.

The user can answer an incoming communication using the interface. If an incoming call is detected, then a message is presented to the user. The message overrides the current display. Typically, the message includes either the name of the calling party or the calling number. In addition a message or other audible prompt may be presented to the user. This information is obtained from the attached device. The user can chose to answer or ignore the call using the soft controls, such as soft controls 142 and 146. See FIG. 7A. Alternatively, the user can use the confirmation control to answer the call. If the user does not respond to the message, then upon the expiration of a predetermined amount of time, the system returns to the previous mode.

Figure 7B:
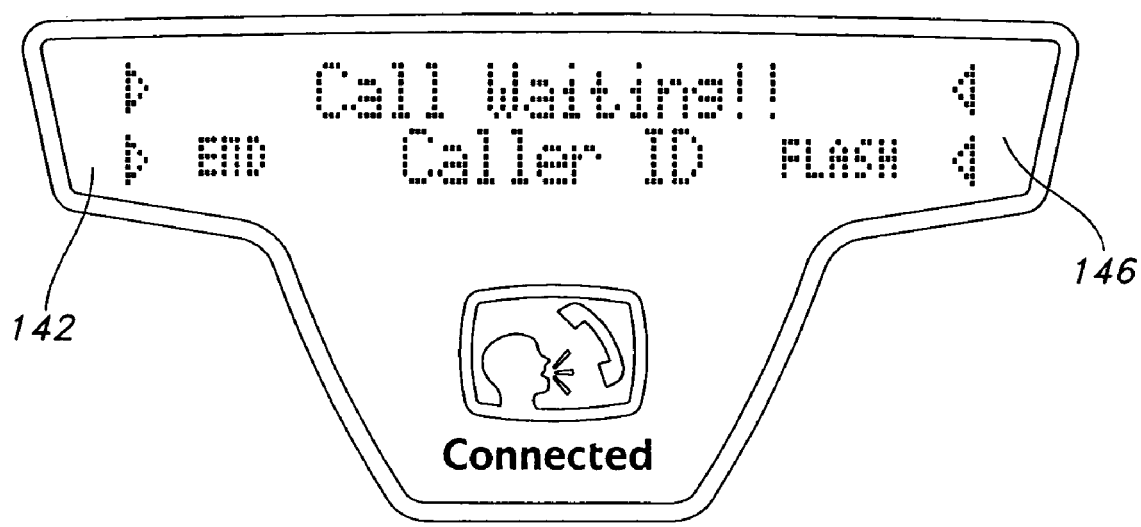

If the attached device supports call waiting, then a call waiting message is presented to the user when a call is waiting. The user can chose to end the current call or answer the waiting call using the soft controls, such as soft controls 142 and 146. See FIG. 7B.

Remote User Access

If a cellular telephone or other wireless device is installed in the vehicle, then the user can access certain functions remotely. The user dials a number associated with the connected device and enters a password in order to access the system. Once connected, the user can perform a number of functions, including speaking to the driver, locking or unlocking the vehicle, checking the location of the vehicle, setting an alarm, and checking the status of an alarm. Additional functions may also be available to the user if the system is connected to a vehicle system bus or other vehicle controller. For example, the user may be able to disable the fuel line or otherwise cause the vehicle to shut down if the user determines that the vehicle has been stolen.

Navigation Mode

To provide navigation information, the system interfaces with a navigation service. The navigation service maintains databases, including a street database and a point of interest ("POI") database. Typically, the system caches information received from the navigation service. The amount and type of information cached depends upon the navigation service used, as well as the capacity of the system. In some embodiments, the cached information is updated as the vehicle moves.

The navigation mode includes a number of features, including navigation by address, navigation by phone, navigation by name and navigation by place. To enter the navigation mode from another mode, the user selects the navigation mode control. If the user has previously used the navigation mode, then the previously selected feature is activated. If the user has not previously selected the mode, then a default feature is activated. The user can cycle through the available features by repeatedly activating the navigation mode control.

The navigation by address feature allows the user to specify a destination using an address. The user enters the address using the soft controls. In one embodiment, each of the soft controls is associated with an address element, such as street number, street, city or state. See FIG. 8A. When the navigation by address feature is activated, the system determines the current position and populates the street, city and state address elements with information for the current position. The user can enter the destination address by selecting a soft control that corresponds to the address element that needs to be modified. The system works from largest parameter to smallest parameter, i.e. from state to city to street to street number. Therefore, it is most efficient if the user first modifies the largest address element that needs to be changed. Because users frequently use a navigation system to reach a destination within the same city, this organization minimizes the amount of user input required to set a destination for many situations.

Figure 8A:
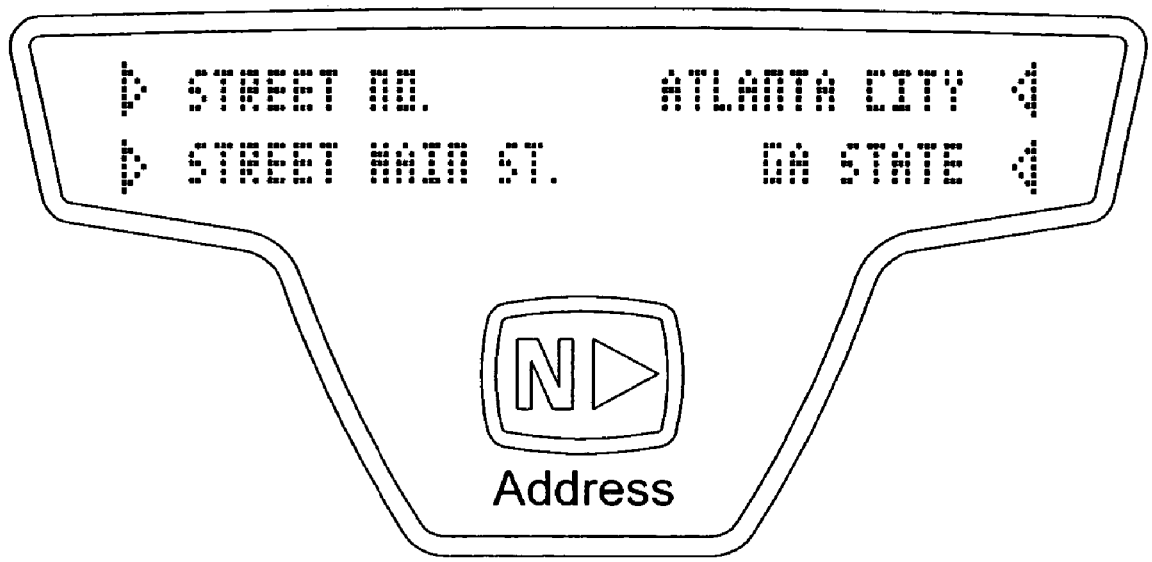
FIGS. 8A, 8B, 8C, 8D and 8E illustrate exemplary display screens and exemplary soft controls for a navigation mode in accordance with an embodiment of the invention.

Activating the next control, confirmation control or "state" soft control, in FIG. 8A causes the system to prompt the user to enter a state. Once the user enters an address element, the system prompts the user for the next smallest parameter. Thus, if the user enters a street name, the system prompts the user for the street number.

In one embodiment, the user can use the select control or soft controls to scroll through a list of states, cities or streets. The lists are typically presented in alphabetical order. For the state list, the list starts at the first state in the alphabetized list. For the city list, if the current state was accepted, then the city list starts at the current city. If the current state was not accepted, then the city list starts at the first city in the alphabetized list. For the street list, if the current city was accepted, then the street list starts at the current street. If the current city was not accepted, then the street list starts at the first street in the alphabetized list.

Alternatively, the user can enter a state, city or street name using the preset controls to enter the letters of the address element. The preset controls default to letter entry in these situations. The system provides an auto complete function so that the system attempts to complete the city or state name based on the letters input by the user. Once the user locates or enters the state, city or street name, the user selects the next control or the confirmation control to accept the entry. The preset controls are also used to enter a street number. In this situation the preset controls default to number entry.

The navigation by phone feature allows the user to specify a destination by specifying a telephone number associated with the location. This feature uses a remote reverse lookup service to determine an address from a telephone number. The user uses the preset controls to enter a telephone number. For this feature, the preset controls default to number entry. The telephone number entry is similar to that described above in connection with the communications mode.

Once the telephone number has been entered, the user activates the next or confirmation control to accept the number. The number is transmitted to the reverse lookup service and the reverse lookup service returns the address and possibly the name associated with the telephone number. The name and address are displayed to the user so that the user can verify the destination. The user verifies the destination by activating the next or confirmation control.

The navigation by name feature allows the user to specify a destination by specifying a name associated with the location. This feature uses the phone book associated with the attached wireless device and a remote reverse lookup service to determine an address from a name. The user scrolls through the phone book in a manner similar to that described above in connection with the phone by name feature. The user selects a name from the phone book by activating the next or confirmation control.

Once the name has been selected, the system determines the telephone number associated with the name using the attached wireless device. The number is transmitted to the reverse lookup service and the reverse lookup service returns the address and possibly the name associated with the telephone number. The name and address are displayed to the user so that the user can verify the destination. The user verifies the destination by activating the next or confirmation control.

The navigation by place feature allows the user to specify a destination by selecting from a destination or point of interest ("POI") list. The information for the list is provided by the navigation service. The point of interest list includes locations for businesses, landmarks, public services, etc. The list can be organized by name, by type or by location. If the list is organized by location, then those POIs that are within a predetermined distance are included. For example, if the predetermined distance is a 10-block radius, then those locations within a 10-block radius of the vehicle's current location are included.

The navigation by place feature allows the user to specify a destination by specifying a name associated with the location. If the list is organized by name, then the list is an alphabetical list of all of the relevant POIs. The list includes a name associated with the destination, as well as the vehicle's current distance from the destination.

If the list is organized by type, then the contents of the list will depend upon the current category and subcategory. In one embodiment, a hierarchy of categories and subcategories is used to organize the relevant POIs by type. Exemplary categories include, airport ATM, gas station, grocery store, lodging, and restaurant. Each category can be divided into one or more subcategories, as applicable. For example, the restaurant category can be divided into restaurants that offer a particular kind of service, such as fast food or cafeteria, or a particular kind of cuisine, such as Chinese, Mexican, or Italian. The subcategories can be further divided into sub-subcategories. For example, the fast food subcategory can include individual fast food restaurants. The contents of the lists presented to the user can change as the vehicle changes location so that the user is presented with the most relevant choices.

Figure 8B:
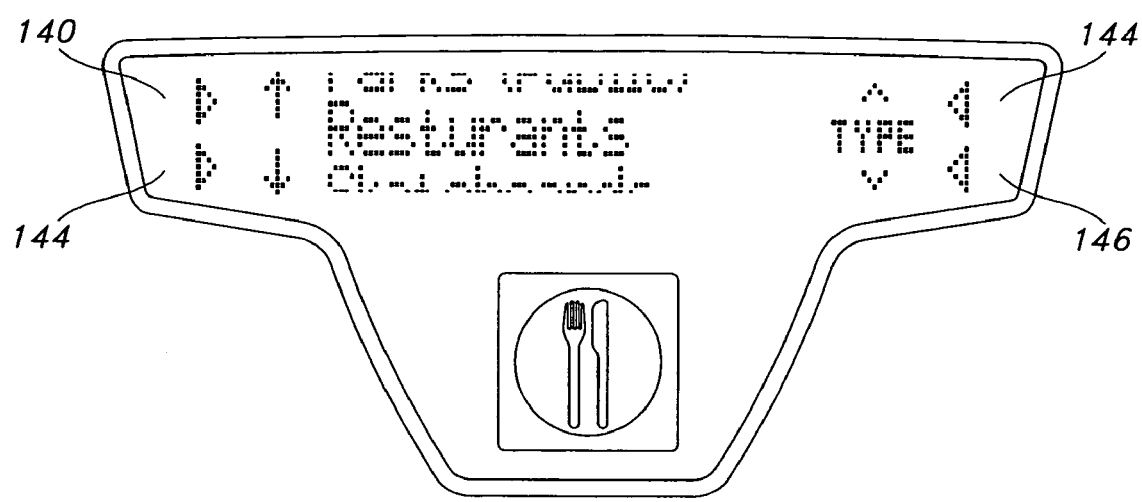
Figure 8C:

In one embodiment, the list, as well as the list modifiers and the list controls are displayed in the first display area and an icon representing the selected list item is displayed in the second display area. For example, FIG. 8B illustrates an exemplary display presented to a user that is searching via category and FIG. 8C illustrates an exemplary display presented to a user that is searching via name.

Upon activation of the navigation by place feature, the system displays a list using the last search organization used or a default organization if no previous search. The user can scroll through the list using a pair of soft controls, such as soft controls 140 and 142. Alternatively, the user can scroll through the list using the select control. The user can select a different list by selecting a different list modifier using a pair of soft controls, such as soft controls 144 and 146, to scroll through the list modifiers or can use the back control to move back one level in the organizational hierarchy. See FIG. 8B. Once the user has located the desired POI, the user selects the POI using the confirmation control or the next control.

Figure 8D:
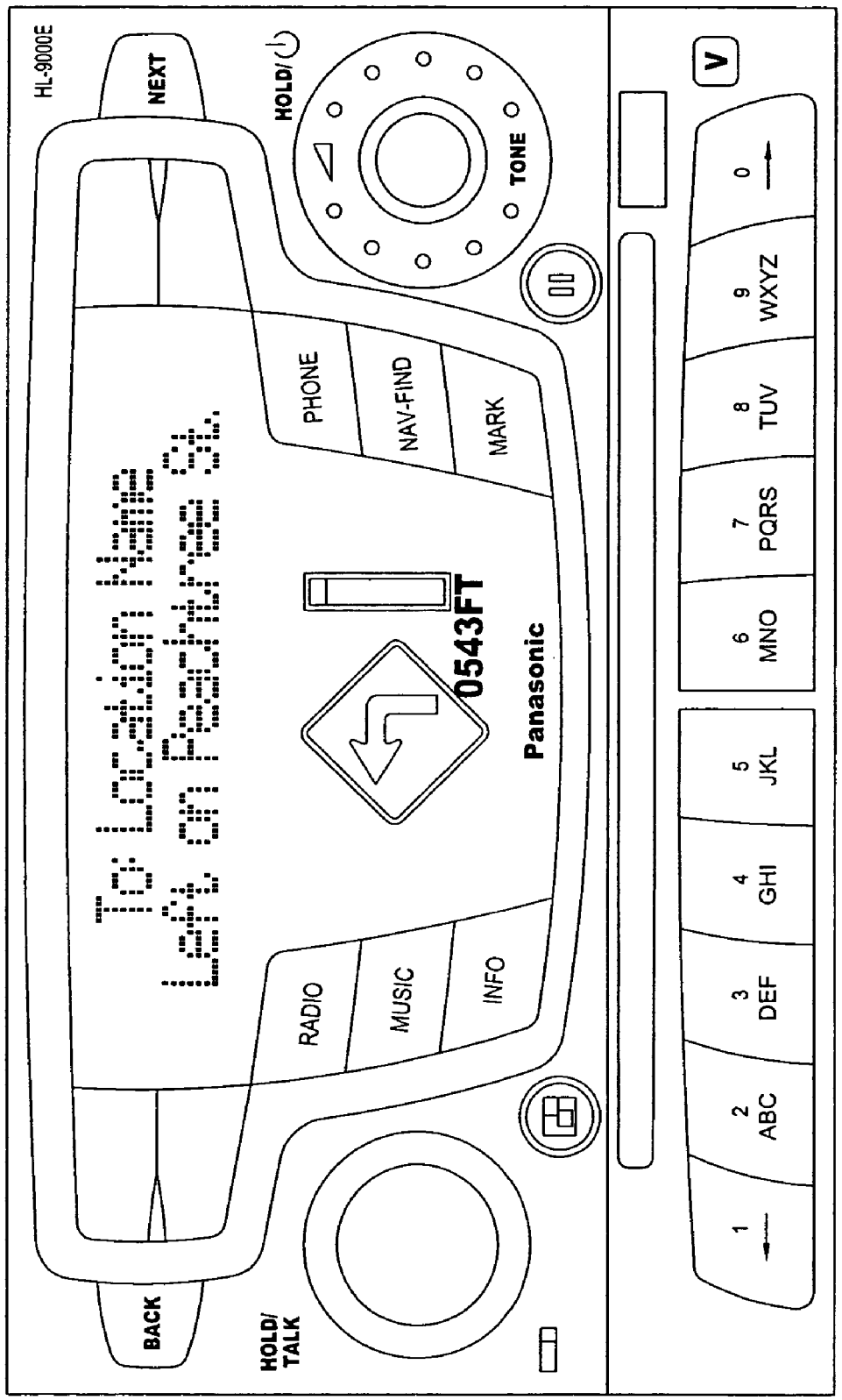

Once the user selects a destination using any of the navigation features, the system calculates a route to the destination. The route is presented to the user using a combination of TTS commands or audible prompts, text information and graphics. For example, FIG. 8D illustrates that text instructions are presented in the first display area (Left on Peachtree St.) and graphic instructions are presented in the second display area (icons for left turn arrow and distance to turn). In addition a TTS command instructs the user to "turn left on Peachtree Street in 550 feet."

As an alternative to presenting graphic instructions, the second display area can be used to display advertising or other promotions. The advertising or promotions could be provided by the navigation service. In particular, the advertising or promotions could be location based, so that an advertisement is provided about a nearby business. By providing advertising and collecting advertising revenue, the navigation service can offset the cost of providing navigation services to the user. The content is not limited to advertising or promotions. It can include any type of location-based service.

Depending upon the amount of time until the user is required to take action, the system may switch from the navigation mode to the long duration mode previously selected by the user. The system determines the amount of time it anticipates will pass before it needs to communicate again with the user. If the anticipated amount of time exceeds a predetermined amount of time, then the system switches to the long duration mode. If the system switches modes, then the system switches back to the navigation mode before the user is required to take action so that the user can be alerted to the required action in a timely manner. For example, if the route includes a 25-mile stretch on the same road, then once the user is on the road, the system will switch back to the long duration mode. The system will return to the navigation mode prior to issuing the next instruction to the user. In this manner, the system provides navigation instructions and also allows the user to listen to content when no instructions are needed.

Figure 8E:
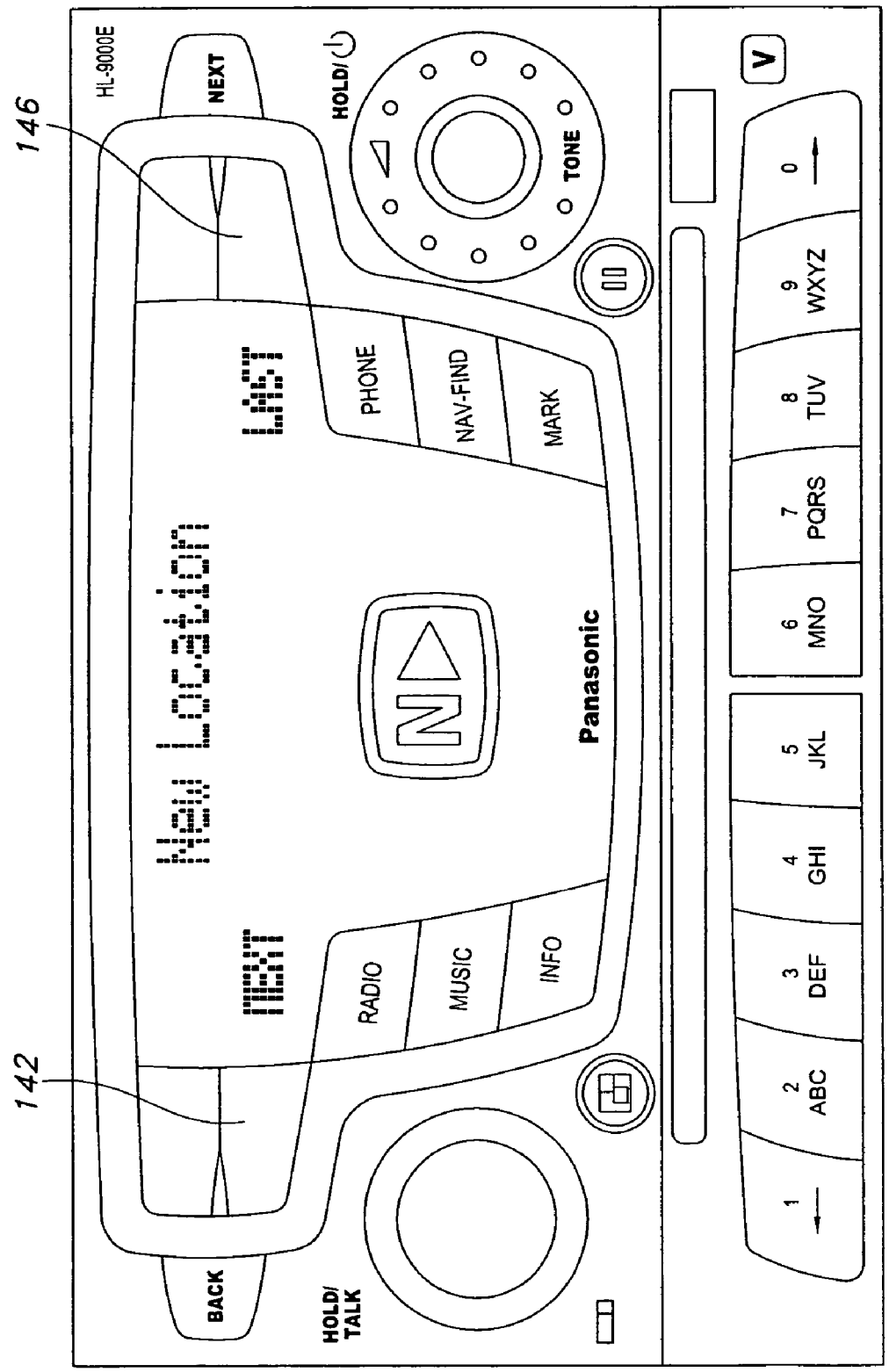

While en route, the user can cancel a route or add a destination to the route by selecting the navigation mode control. The destination can be added as the next destination or the last destination. The user selects the order of the added destination using the soft controls. In one embodiment, soft control 142 is associated with the next destination and soft control 146 is associated with the last destination. See FIG. 8E.

Once the user arrives at the destination, the user can either end the navigation mode or mark the destination. If the user elects to mark the destination, then the user is prompted for a destination name, as well as other information about the destination so that the destination can be added to the POI list and appropriately indexed.

Mark Mode

The mark mode includes a single feature, which allows the user to quickly select a destination. To enter the mark mode from another mode, the user selects the mark control. The user selects a marked destination using one or more of the preset controls or using a list of marked destinations. Once the user selects a marked destination, the user activates the next or confirmation control to confirm the selection and the system determines a route to the marked destination.

In one embodiment a marked location is associated with each preset control. The user obtains directions to a marked location by selecting the mark control, the appropriate preset control, and the next or confirmation control. Thus, the user can obtain directions with minimal interaction with the system. This embodiment limits the number of marked locations to the number of preset controls.

In another embodiment, a marked location is associated with multiple preset controls. In this embodiment, the number of marked locations is not limited to the number of preset controls. For example, ten preset controls (0–9) can be used to identify one hundred marked locations by associating each location with a two-digit number (00–99) that is specified using the preset controls. Both embodiments may be available within the same system. If so, then the user selects one embodiment in the mark mode setup.

As an alternative to the preset controls, the user can select a marked location using a list of destinations. The mark mode supports two types of destinations, specific destinations and generic destinations. A specific destination is associated with a specific location, such as the user's home. A generic destination is associated with multiple destinations, such as a gas station. If the user selects a specific destination, then the system determines a route to that destination. If the user selects a generic destination, then the system determines the closest destination that satisfies the generic description. For example, if the user selects gas station, then the system locates the closest gas station and determines a route to that gas station. Generic destinations may be arranged hierarchically in a manner similar to that described above in connection with navigation by place.

Figure 9:
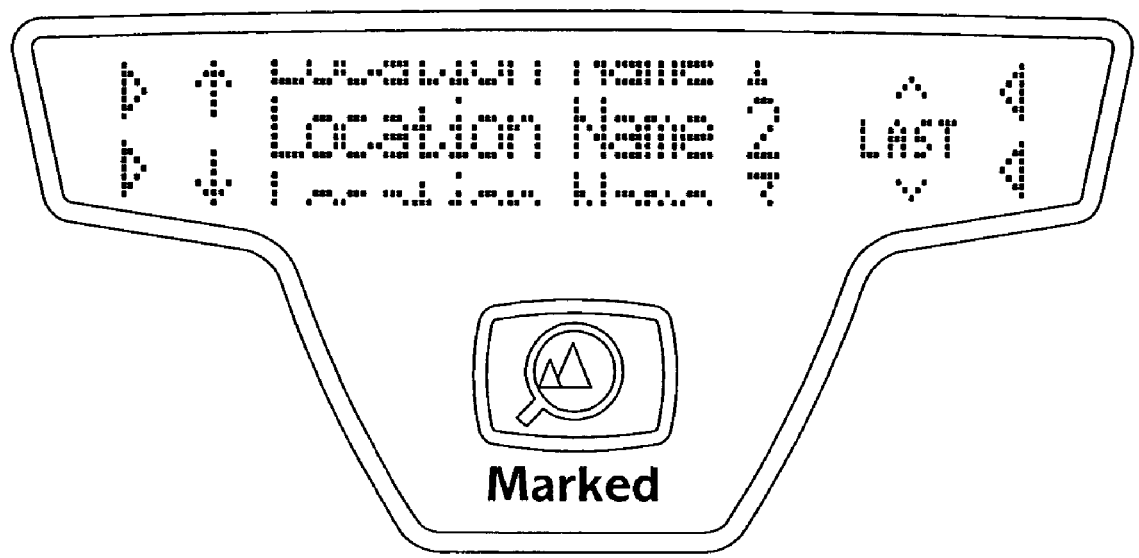
FIG. 9 illustrates an exemplary display screen and exemplary soft controls for a destination mark mode in accordance with an embodiment of the invention.

The user selects a list of destinations by selecting a list modifier. In one embodiment, the list modifiers include specific, generic and recent. If the specific list modifier is selected, then a list of specific destinations is displayed. If the generic list modifier is selected, then a list of generic destinations is displayed. If the recent list modifier is selected, then a list of the most recent destinations accessed via the mark mode is displayed. See FIG. 9.

The user can enter a new marked location by selecting and holding one of the preset controls. The user can mark the present location or can mark a remote location. The user indicates whether the marked location corresponds to the present location or a remote location by selecting the soft control labeled "new", e.g. soft control 142, or the soft control labeled "remote", e.g. soft control 146. If the user indicates that the location corresponds to a remote location, then the user is prompted to input the location using an interface similar to that described above in connection with the navigation mode. The user can define the name assigned to the marked location.

Restricted Mode

The restricted mode allows the user to lock certain modes or features of the system. The user activates the restricted mode by activating the restricted mode control and entering a password using the preset controls. The restricted mode supports two types of locks, valet and parental.

Figure 10:
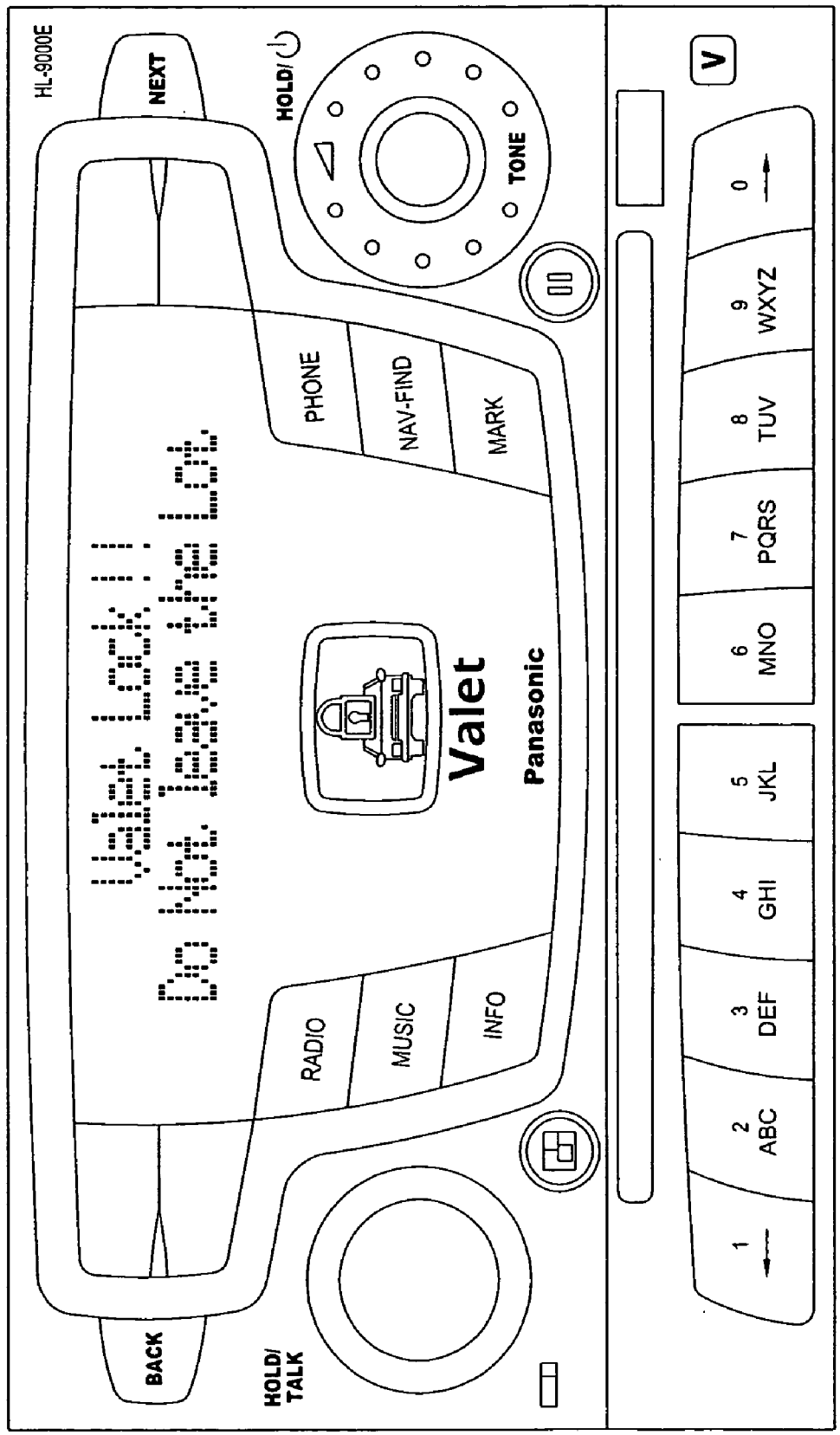
FIG. 10 illustrates an exemplary display screen for a restricted mode in accordance with an embodiment of the invention.

The valet lock can be used when the vehicle is left with a valet attendant. All of the modes and features of the system (except the restricted mode) are disabled when the valet lock is activated. The system periodically announces that the valet lock is active via a TTS message. The system may also display a text message and/or a graphic icon indicating that the valet lock is active. See FIG. 10. The system monitors the vehicle and contacts the user if certain predetermined parameters are exceeded. For example, the vehicle's speed and location are monitored to determine whether the valet attendant drives the vehicle at an excessive speed or outside a small geographic area.

The parental lock is similar to the valet lock, but allows some or all of the modes or features to remain enabled. The parameters for the parental lock are typically different than the parameters for the valet lock. In addition, the system only announces that the parental lock is active upon vehicle startup.

If the parameters are exceeded, then the user is contacted via an attached device. For example, if a cellular telephone is attached, the telephone can be used to contact the user via telephone, pager, e-mail, or any other method desired by the user.

To disable the valet lock or the parental lock, the user re-enters the user's password using the preset controls.

External Interface

As discussed above, the system can communicate with a remote server to access information offered by service providers, such as information services, reverse look-up services and navigation services. As used herein the term remote server includes any device that is external to the system. The device may be located in the vehicle, such as a PDA in the vehicle, or may be located outside the vehicle, such as a server associated with an ISP.

In one embodiment, the system uses one or more XML scripts to request information from the remote server and an XML parser to extract the relevant information. The system determines how to present the information to the user. For example, the system determines if the information is presented to the user as displayed text, displayed graphics or via the TTS engine. Those skilled in the art are familiar with the use of XML scripts to retrieve information. The use of XML scripts allows the system to work with a variety of services without requiring the services to support a particular interface.

The XML scripts can be modified or new XML scripts can be created to support new services or interfaces. Existing systems can be upgraded by installing the modified or new XML scripts. Moreover, XML scripts can be used to tailor the system for different models of vehicles.

Multizone Systems

Some multifunctional systems can provide different entertainment to different zones of a vehicle. In one embodiment, there are three zones, a front zone, a right rear zone and a left rear zone. However, as will be apparent to those skilled in the art, the invention is applicable to any number or configuration of zones. The terms "primary zone" and "front zone" are used interchangeably herein, as are the terms "secondary zone" and "rear zone".

In one embodiment, the system includes a primary interface mounted in the front of the vehicle, two displays mounted in the rear of the vehicle, two sets of headphones and two remote controllers. Each display includes two IR interfaces, one for the headphones and one for a remote controller, and a secondary interface or rear seat controller to select and control the active mode for the zone served by the display. The headphones and the remote controllers include a switch to select between the two rear zones.

There are several options for outputting the audio for the active modes to the speakers and headphones. In one embodiment, the system is configured so that the vehicle speakers output audio corresponding to the active mode for the front zone. If there is a different active mode for a rear zone, then the headphones associated with the rear zone output the audio for the active mode for the rear zone. In another embodiment, the system is configured so that the back vehicle speakers are off whenever an active mode for one of the rear zones is different than the active mode for the front zone. In yet another embodiment, the system is configured so that the back vehicle speakers output audio corresponding to the active mode for the front mode when the active mode for the front zone is a stored content mode and the active mode for one of the rear zones is different than the active mode for the front zone. In all other configurations where the active mode for the front zone and the active mode for a rear zone are different, the rear speakers are off. The third embodiment minimizes interference between the active mode for the front zone and the active modes for the back zones, but still allows the rear speakers to be used with those sources where they will significantly enhance the audio.

User Interface

A user associated with a zone can select an active mode for the zone, as well as the features or other settings associated with the active mode. If multiple zones share a mode source, then control of the mode is shared. However, a user associated with the primary zone can control a secondary zone regardless of whether the primary zone and the secondary zone share the same mode source.

Figure 11:
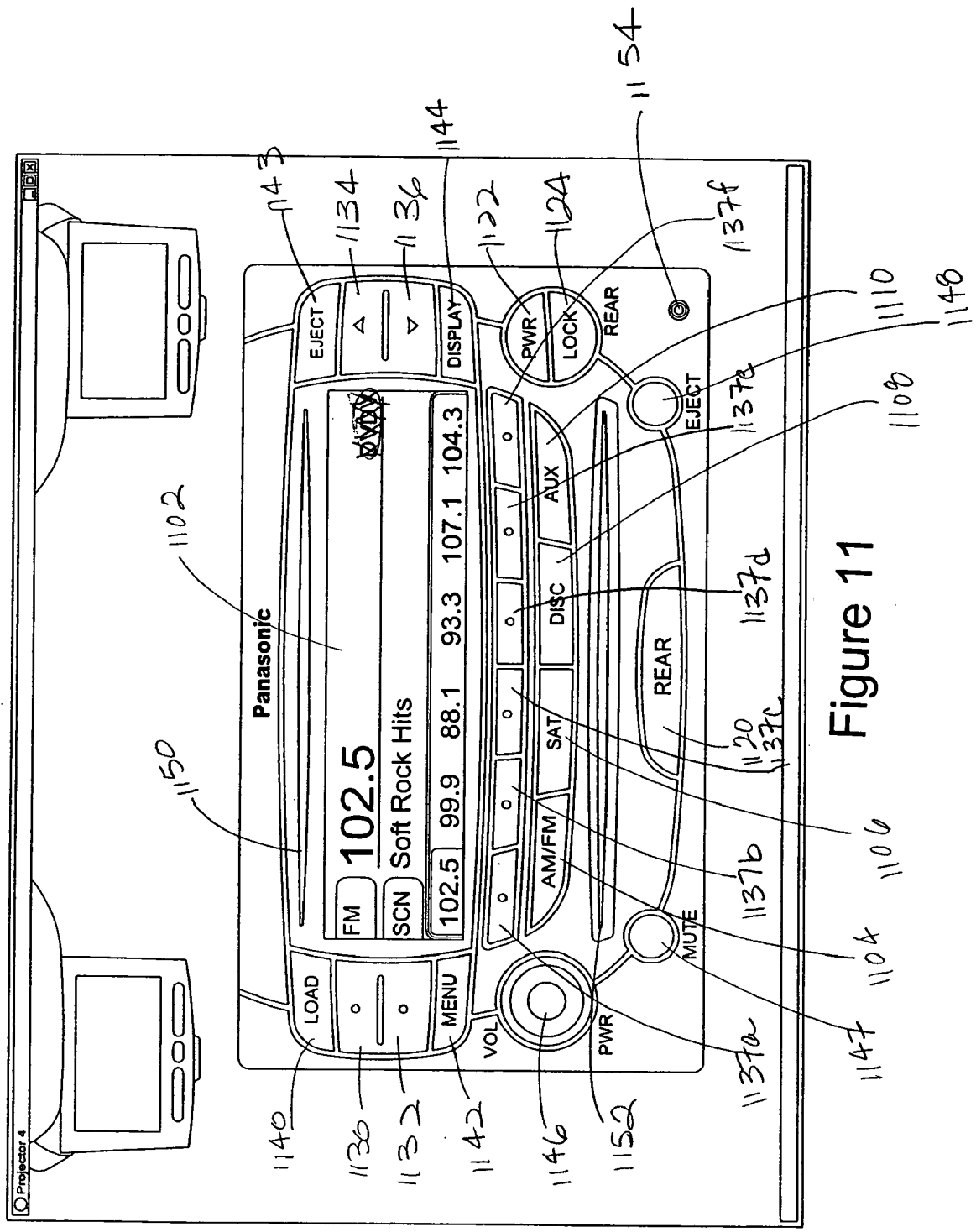
FIG. 11 illustrates an exemplary interface panel for use in accordance with a multizone embodiment of the invention.

FIG. 11 illustrates an embodiment that supports a multi-zone system. The primary interface includes a display 1102 that provides text information, including labels for soft controls and preset controls, lists, list modifiers, descriptive text and prompts. The display area can use different colors, different fonts and different sized text to assist the user in distinguishing between different types of information.

Soft controls 1130, 1132, 1134 and 1136, and preset controls 1137a–1137f are proximate to the display area. For the multizone embodiments, the terms "soft control" includes "preset control". The soft controls can be placed along various sides of the display, including, but not limited to, the right and left side and the bottom of the display, as shown in FIG. 11. The current function of a soft control is indicated by a label, symbol or icon shown on the display adjacent to the soft control. If the soft control is not functional in a particular mode, then the display is blank next to the soft control. For example, FIG. 11 illustrates that soft control 1130 is used to toggle between AM radio and FM radio, soft control 1132 is used to enable/disable scanning for the selected radio band and the preset controls 1137a–1137f are used for radio presets. The display area next to soft controls 1134 and 1136 is blank since those soft controls are not functional in the active mode.

In one embodiment, the interface includes multiple disc players, which can be either single disc players or multiple disc players. FIG. 11 illustrates a single disc player 1152 and a multiple disc player 1150. The disc players can include media sensing so that a single player can play multiple disc formats, such as CD, MP3, DVD (audio and video), etc. The load 1140 and eject 1143 controls are used to load and eject discs from the multiple disc player and the eject control 1148 is used to eject a disc from the single disc player. The interface also includes an auxiliary jack 1154 for receiving audio from an auxiliary device, such as a portable media device.

Figure 12A:
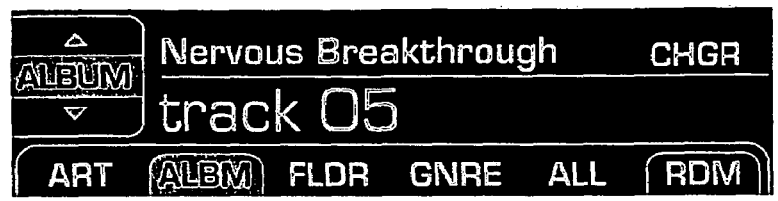
FIGS. 12A, 12B and 12C illustrate exemplary display screens for the various display modes in accordance with an embodiment of the invention.
Figure 12B:
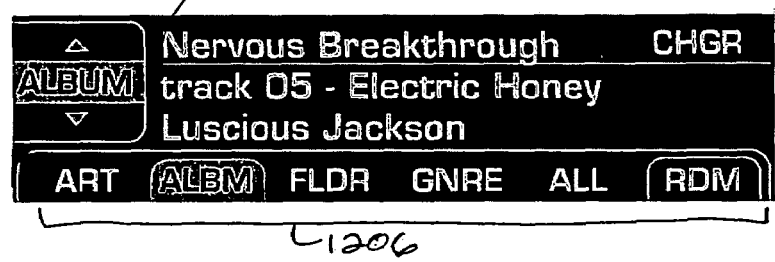
Figure 12C:
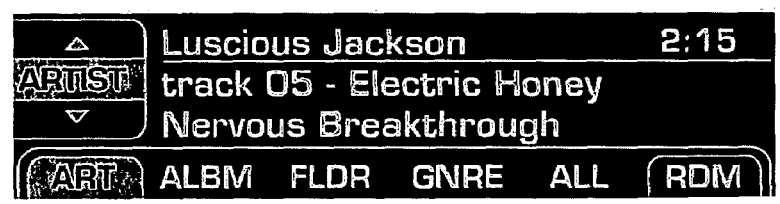

The display control 1144 controls the display mode. In one embodiment, there are three display modes, simple, information and clock. The simple and the information display modes display information about the active mode, with the information display mode providing more information than the simple display mode, and the clock display mode displays the time. FIGS. 12A, 12B, and 12C illustrate the simple display mode, the information display mode and the clock display mode for an MP3 disc respectively. Repeatedly activating the display control cycles between the display modes.

The exemplary mode controls shown in FIG. 11 correspond to a first broadcast content mode, such as AM/FM radio 1104, a second broadcast content mode, such as satellite radio 1106, a stored content mode, such as a CD, MP3 disc or DVD player 1108, and an auxiliary device 1110. In another embodiment, there could be a single broadcast content mode with AM, FM and satellite radio as features or multiple stored content mode controls, one for each disc player.

The menu control 1142 controls the information that is displayed and is mode dependent. For example, activating the menu control in either of the broadcast content modes cycles through the various banks of presets. If the disc mode corresponds to a multiple disc player, then activating the menu control cycles between displaying the disc IDs and displaying the play controls.

The interface includes a zone control 1120 for selecting the active zone. There is a primary zone and at least one secondary zone. In one embodiment, there are three zones, a front zone, a right rear zone and a left rear zone. However, as will be apparent to those skilled in the art, the invention is applicable to any number or configuration of zones. Repeatedly activating the zone control cycles between the zones. Once a zone is selected as the active zone via the zone control, the remaining controls are used to select and control the active mode for the active zone.

The interface includes a secondary or rear power control 1122 and a secondary or rear lock control 1124. The secondary power control controls the power to the secondary or rear seat components so that if the secondary power control is off, then the secondary users cannot access any of the information or entertainment sources. The secondary lock control determines whether the secondary users can control the active mode for the primary zone. If the secondary lock control is active, then the secondary users cannot control the active mode for the primary zone. If the rear lock control is not active, then the secondary user can control the features of the active mode for the primary zone. For example, a rear seat passenger can select a different radio station, but cannot change from satellite radio mode to stored content mode. Repeatedly activating the secondary lock control cycles between allowing the secondary users to control the features for the active mode for the primary zone and prohibiting the secondary users from controlling the features for the active mode for the primary zone.

Zone Control

Figure 13:
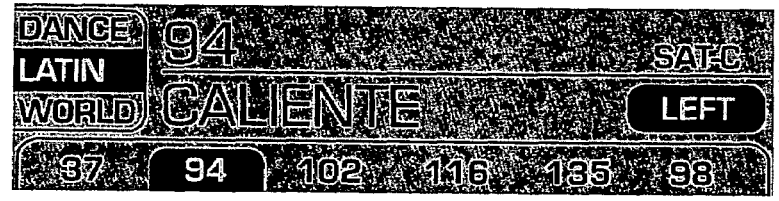
FIG. 13 illustrates an exemplary display screen illustrating the selection of a secondary zone in accordance with an embodiment of the invention.

The primary user can control the secondary zones via the zone control 1120. When a secondary zone is selected via the zone control, information regarding the active mode for the selected secondary zone is displayed. The display includes a zone indicator that identifies the selected zone. In one embodiment, the display color is "reversed" to indicate that the information corresponds to a secondary zone. If there are multiple secondary zones, then the display also includes a zone identifier, such as "LEFT". FIG. 13 illustrates a display with reversed color and a zone identifier.

When a secondary zone is selected via the zone control, the primary user and the secondary user can both control the active mode for the selected secondary zone. The terms "primary user", "driver" and "front seat passenger" are used interchangeably herein, as are the terms "secondary user" and "rear seat passenger". If the primary user activates and holds the zone control while controlling one of the secondary zones, then the active mode for the primary zone switches to the active mode for the selected secondary zone.

Figure 14:
FIG. 14 illustrates an exemplary display screen illustrating the selection of a mode associated with a secondary zone in accordance with an embodiment of the invention.

As an alternative to using the zone control, the primary user can select the active mode of one of the secondary zones using the appropriate mode control. For example, if the front zone is listening to a CD and the right rear zone is listening to satellite radio, then the driver can select the right rear zone by selecting the mode control for satellite radio. If so, then information regarding the satellite radio mode is displayed, as shown in FIG. 14. In one embodiment, the color of the display is not reversed, as it is when the zone control is used. Instead a zone indicator is flashed on the display to indicate that the displayed mode corresponds to another zone. For example, "RIGHT" is the zone indicator shown in FIG. 14. When a secondary zone is selected via one of the mode controls, the primary user and the secondary user can both control the active mode for the selected secondary zone. Another way that the primary user and the secondary user share control of the active mode for the primary zone is if the secondary user selects the active mode for the primary zone as the active mode for the secondary zone. If so, then the primary user and the secondary user share control of the active mode.

Broadcast Content Mode Control

In one embodiment, there are two broadcast content modes and two broadcast content mode controls, 1104 and 1106. One of the broadcast content modes corresponds to AM/FM radio and the second broadcast content mode corresponds to satellite radio. If there are no zones that are currently using the broadcast content mode, then when the broadcast content mode control 1104, 1106 is selected by the primary user, the selected broadcast content mode becomes the active mode for the primary zone. The station of the selected broadcast content mode last listened to by the primary zone is selected (regardless of any intervening use by the secondary zones) and the last used bank of presets is displayed.

If one of the secondary zones is using the broadcast content mode, then the first activation of the mode control 1104, 1106 allows the primary user to "listen in", i.e. to play the audio for the active mode for the secondary zone through the primary zone speakers, and displays the bank of presets last used by the primary zone. The second activation of the broadcast content mode control, selects the station last listened to by the primary zone and continues to display the last bank of presets used by the primary zone. The third activation of the broadcast content mode control advances through the banks of presets for the primary zone.

Once the broadcast content mode is the active mode for the primary zone, then in one embodiment, repeatedly activating the broadcast content mode control 1104, cycles between the available presets for the mode, such as one bank of AM presets and three banks of FM presets. In another embodiment, repeatedly activating the broadcast content mode control 1104, cycles between AM radio and FM radio. Similarly, once the second broadcast content mode is the active mode for the primary zone, then in one embodiment, repeatedly activating the second broadcast content mode control 1106, cycles through the available banks of presents for satellite radio. In another embodiment, there is no change if the second broadcast content mode control is repeatedly activated.

Figure 15:
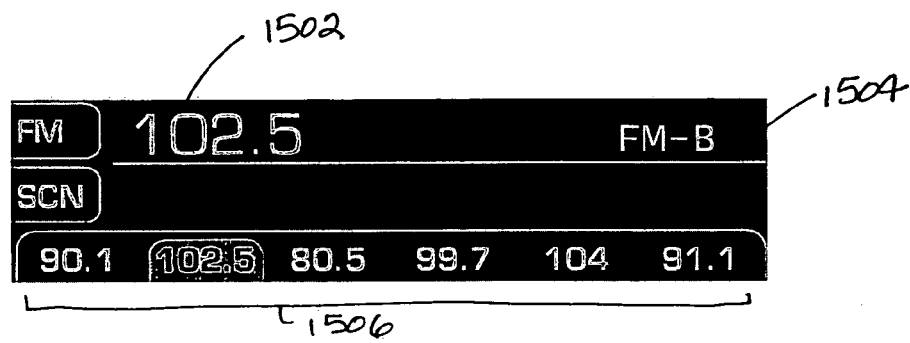
FIG. 15 illustrates an exemplary display screen for a broadcast content mode in accordance with an embodiment of the invention.

FIG. 15 illustrates a display for the broadcast content mode that includes information regarding the current station 1502, and the selected preset bank 1504, as well as the preset labels 1506 for the preset controls.

Figure 16:
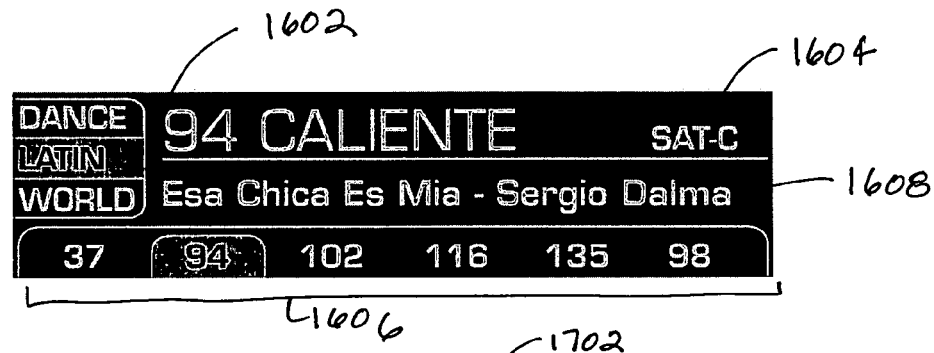
FIG. 16 illustrates an exemplary display screen for another broadcast content mode in accordance with an embodiment of the invention.

FIG. 16 illustrates a display for the second broadcast content mode that corresponds to the information display mode and includes information regarding the current station 1602, the selected preset bank 1604, and preset labels 1606 for the preset controls, as well as information about the content being played 1608.

Stored Content Mode Control

In one embodiment, there are two disc players and a single stored content mode control 1108. One of the disc players is a single disc player and the second disc player is a multiple disc player. If no secondary zones are listening to either of the disc players, then when the stored content mode control 1108 is activated, the stored content mode becomes the active mode for the primary zone and the single disc player becomes the active mode source. If the disc that was last played in the primary zone remains in the disc player, then the disc is restarted from the point where it was last stopped. If the disc has been changed, then the disc is played from the beginning. If the stored content mode control is activated a second time, then the stored content mode remains the active mode for the primary zone and the multiple disc player becomes the active mode source. As in the case of the single disc player, if the disc that was last played in the primary zone remains in the disc player, then the disc is restarted from the point where it was last stopped. If the disc has been changed, then the disc is played from the beginning. Repeatedly activating the stored content mode toggles the active mode source for the primary zone between the single disc player and the multiple disc player.

In one embodiment if one of the secondary zones is listening to the single disc player and the other secondary zone is listening to the multiple disc player, then when the stored content mode control is activated, the primary zone "listens in" on the single disc player. If the stored content mode control is activated a second time, then the primary zone "listens in" on the multiple disc player. Repeatedly activating the stored content mode control toggles between the single disc player and the multiple disc player.

In an alternative embodiment with two stored content mode controls, the operation of the stored content mode controls more closely follows the operation of the other mode controls when a secondary zone is listening to the mode source. If one of the secondary zones is using the stored content mode, then the first activation of the mode control allows the primary user to "listen in" to the stored content being played in the secondary zone. The second activation of the stored content mode control, restarts the disc last listened to by the primary zone from the point where it was previously stopped (or restarts the disc from the beginning if the disc has been changed).

Figure 17:
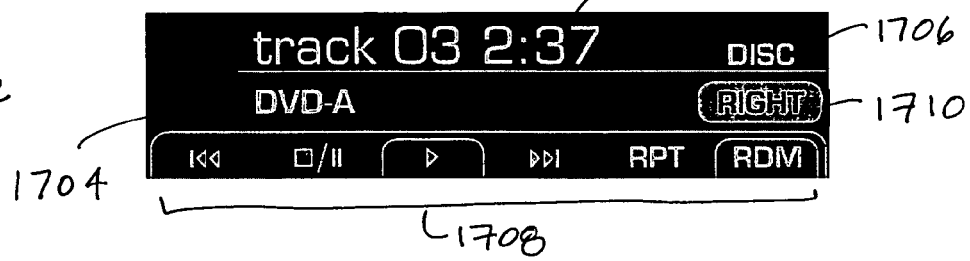
FIG. 17 illustrates an exemplary display screen for a stored content mode in accordance with an embodiment of the invention.

FIG. 17 illustrates a display for the stored content mode when the mode source is a single disc player and includes information indicating the current selection 1702, the disc type 1704, the active mode 1706, and play controls 1708. The active play controls are outlined. For example, the active controls are "random" and "play" in FIG. 17. In addition, the display includes a zone indicator 1710 that indicates that the right rear zones shares the mode source.

Figure 18:
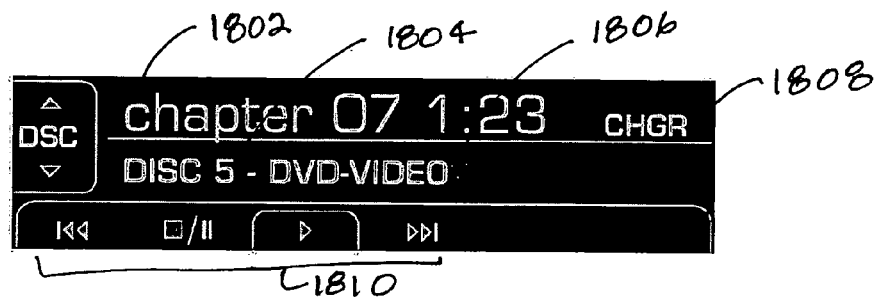
FIG. 18 illustrates another exemplary display screen for a stored content mode in accordance with an embodiment of the invention.

FIG. 18 illustrates a display for the stored content mode when the mode source is a multiple disc player that corresponds to the information display mode and includes information indicating the current selection 1802, the disc slot 1804, the disc type 1806, the active mode 1808, and play controls 1810.

FIG. 12B illustrates a display for the stored content mode when the mode source is a multiple disc player playing an MP3 disc that corresponds to the information display mode.

FIG. 12B includes information indicating the current selection 1202, the active mode 1204 and browsing controls 1206. The preset controls are use to select a browsing method and the soft controls along the left side of the display are used to browse within the selected method. The color of the browsing control label corresponding to the selected browsing method is reversed.

Figure 19:
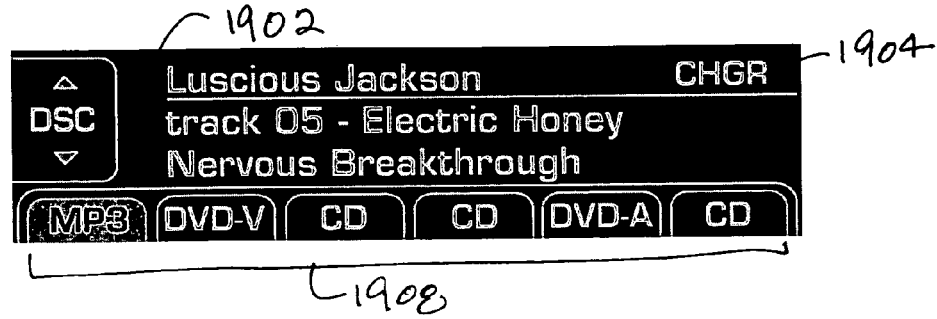
FIG. 19 illustrates another exemplary display screen for a stored content mode in accordance with an embodiment of the invention.

FIG. 19 illustrates a display for the stored content mode when the mode source is a multiple disc player that corresponds to the information display mode and includes information indicating the current selection 1902, active mode 1904, and the disc IDs 1908. Either the preset controls or the soft controls can be used to select a disc. The preset control label corresponding to the selected disc is highlighted.

Figure 20:
FIG. 20 illustrates an exemplary display screen for restarting a stored content mode for a secondary zone in accordance with an embodiment of the invention.

In one embodiment, if the active mode for a secondary zone is the stored content mode, then upon restarting the system, e.g. restarting the vehicle, the activation of a play control is required before restarting the disc in the secondary zone. FIG. 20 illustrates a display that prompts the primary user to begin playing the discs for the secondary zones. By selecting the appropriate preset control, the primary user can restart the selected disc. Alternatively, each secondary user can restart the disc via the remote control. The display also includes information for the active mode for the primary zone.

Audio Controls

As previously described the functions associated with the soft controls vary based on the current mode. In addition to supporting mode specific functions, the soft controls also support certain mode independent functions, such as audio controls. As shown in FIGS. 21A–G the soft controls control the settings for fade, balance, bass, midrange, treble, center channel and subchannel. The user selects the audio control adjust by selecting the corresponding preset control. The other soft controls are used to adjust the settings for the audio control.

Figure 21A:
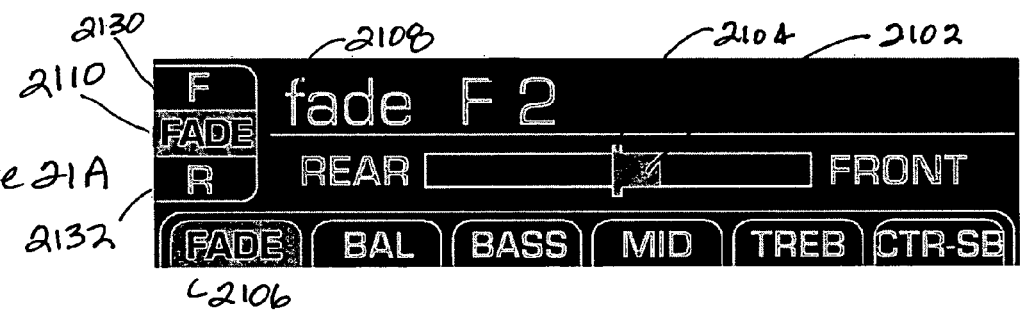
FIGS. 21A–21G illustrate exemplary display screens for adjusting audio controls in accordance with an embodiment of the invention.
Figure 21B:
Figure 21C:
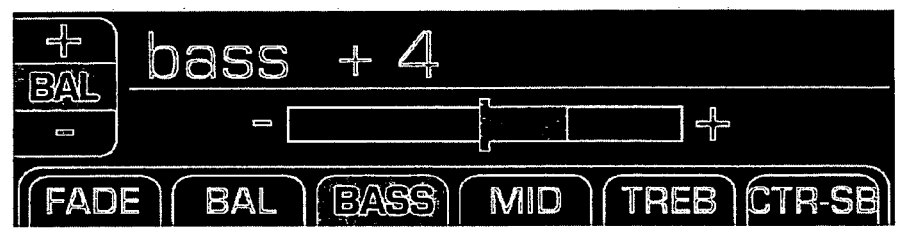
Figure 21D:
Figure 21E:
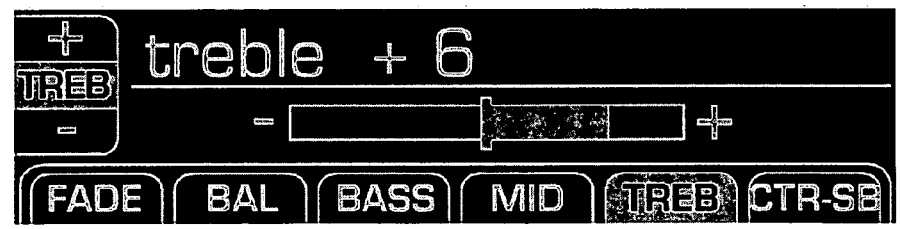
Figure 21F:
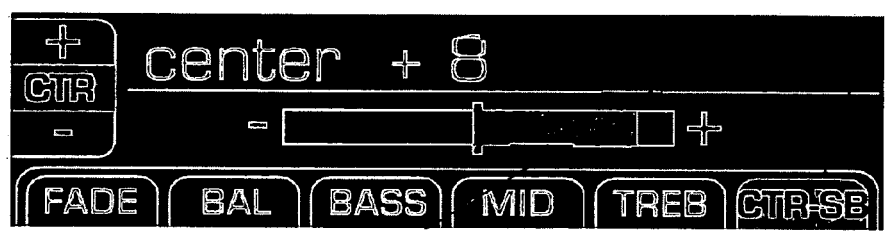
Figure 21G:
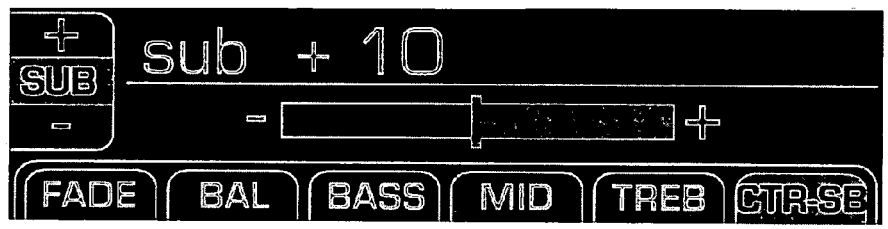

FIG. 21A illustrates the adjustment of the fade control. The display indicates the active audio control by showing the preset control label in reverse color 2106 and providing one or more audio control indicators 2108 and 2110. Soft controls, such as 2130 and 2132 are used to adjust the fade towards the front of the vehicle or towards the rear of the vehicle. The display shows the current settings for the selected audio control via both text and graphics. For example, FIG. 21A indicates that the current fade setting is biased two points toward the front by the text "F 2" and by the bar 2102 which extends past the center point 2104 towards the end of the bar labeled "FRONT."

Exemplary displays for adjusting the balance, bass, midrange, treble, center channel and sub channel are shown in FIGS. 21B–21G respectively. In one embodiment, the center channel and sub channel controls share a single preset control. In this embodiment, repeatedly activating the preset toggles between the center channel and the sub channel.

The foregoing description of the various modes and features illustrates that the system provides an intuitive interface. Some controls provide the same function throughout all modes and features, whereas other controls provide different functions for different modes or features. Even though controls may differ by mode or function, similar tasks in different modes are performed in the same manner. For example, similar prompts are used in the navigation by phone feature and the phone by number feature.

Additional alternative embodiments will be apparent to those skilled in the art to which the present invention pertains without departing from its spirit and scope. For example, although the foregoing description describes that a user interacts with the interface using a set of controls, the user can also interact with the system via voice if the system supports voice recognition. The user can use voice controls exclusively or can use a combination of voice controls and tactile controls.

Moreover, the particular displays, soft controls, lists and list modifiers shown herein are exemplary and can be modified. The modes and mode sources discussed herein are exemplary. The invention includes any type of mode or mode source. The arrangement of the display and the controls, as well as the manner of indicating current modes, features or settings, can also be modified. For example, the placement of the select control and confirmation control may be altered for a right-hand drive vehicle. A multizone system includes a primary zone and one or more secondary zones and is not limited to the number or configuration of zones described herein.

What is claimed is:

1. An interface, comprising:
    a zone control for selecting one of a plurality of zones as an active zone;
    a plurality of mode controls for selecting one of a plurality of modes as an active mode for the active zone, wherein each mode control corresponds to a different mode source;
    a display for providing information related to the active mode of the active zone; and
    a plurality of soft controls, wherein a function associated with a soft control is dependant upon the active mode and wherein the soft controls are adjacent to the display so that for each active soft control the function associated with the soft control is displayed on the display, wherein the interface supports a first active mode associated with a first zone and a second active mode associated with a second zone, wherein the first active mode and the second active mode are active simultaneously and are distinct, and wherein the display displays information related to the first active mode and upon activation of the zone control, displays information related to the second active mode.

2. The interface of claim 1, wherein a first set of the soft controls is adjacent to a first side of the display and a second set of the soft controls is adjacent to a second side of the display and wherein the first side of the display and the second side of the display are approximately perpendicular to each other.

3. The interface of claim 1, wherein the interface further comprises:
    a power control for the first zone; and
    a separate power control for the second zone.

4. The interface of claim 1, wherein the interface comprises a primary interface that includes the zone control, the mode controls, the display and the soft controls, and a secondary interface that includes a plurality of secondary mode controls, and wherein the primary interface further comprises a lock control so that the second zone is controlled only via the primary interface when the lock control is activated.

5. The interface of claim 1, further comprising a select control, wherein activation of the select control causes the display to display a set of audio controls as functions associated with selected ones of the soft controls.

6. The interface of claim 5, wherein the audio controls are adjusted using selected other ones of the soft controls.

7. The interface of claim 1, wherein the zones correspond to different locations within a vehicle.

8. The interface of claim 1, further comprising a display control for controlling a display mode of the display.

9. The interface of claim 1, wherein the first zone is a primary zone and the second zone is a secondary zone, and wherein a user associated with the primary zone can control the second active mode by activating the mode control that corresponds to the second active mode.

10. An interface, comprising:
- a zone control for selecting one of a plurality of zones as an active zone;
- a plurality of mode controls for selecting one of a plurality of modes as an active mode for the active zone, wherein each mode control corresponds to a different mode source;
- a display for providing information related to the active mode of the active zone;
- a plurality of soft controls adjacent to at least two sides of the display, wherein selected soft controls provide functions that are dependent upon an active mode and functions that are independent of the active mode and wherein for each active soft control, the function associated with the soft control is displayed on the display;
- wherein the interface supports a first active mode associated with a first zone and a second active mode associated with a second zone, wherein the first active mode and the second active mode are active simultaneously and are distinct, and wherein the display displays information related to the first active mode and upon activation of the zone control, displays information related to the second active mode.

11. The interface of claim 10, further comprising a display control for controlling a display mode of the display.

12. The interface of claim 10, wherein there are at least three zones and repeatedly activating the zone control cycles through the zones in a predetermined manner.

13. The interface of claim 10, wherein the first zone is a primary zone and the second zone is a secondary zone, and wherein a user associated with the primary zone can control the second active mode by activating the mode control that corresponds to the second active mode.

14. The interface of claim 10, wherein the display displays information related to the second active mode using a different display color than used to display information related to the first active mode.

15. The interface of claim 10, wherein the at least two sides of the display are approximately perpendicular to each other.

16. The interface of claim 10, wherein the interface further comprises:
- a power control for the first zone; and
- a separate power control for the second zone.

* * * * *